(12) United States Patent
Ishiwata

(10) Patent No.: US 7,564,622 B2
(45) Date of Patent: Jul. 21, 2009

(54) METHODS FOR IMPLEMENT MICROSCOPY AND MICROSCOPIC MEASUREMENT AS WELL AS MICROSCOPE AND APPARATUS FOR IMPLEMENTING THEM

(75) Inventor: Hiroshi Ishiwata, Hachioji (JP)

(73) Assignee: Olympus Corporation, Tokyo (JP)

( * ) Notice: Subject to any disclaimer, the term of this patent is extended or adjusted under 35 U.S.C. 154(b) by 149 days.

(21) Appl. No.: 11/003,728

(22) Filed: Dec. 6, 2004

(65) Prior Publication Data

US 2005/0168808 A1   Aug. 4, 2005

(30) Foreign Application Priority Data

Dec. 12, 2003   (JP) ............... 2003-414158
Feb. 6, 2004   (JP) ............... 2004-030431

(51) Int. Cl.
*G02B 21/06* (2006.01)
*G02B 21/00* (2006.01)

(52) U.S. Cl. ............... 359/385; 359/368; 359/388
(58) Field of Classification Search ......... 359/368–390, 359/738–740; 356/600–624
See application file for complete search history.

(56) References Cited

U.S. PATENT DOCUMENTS

| 5,086,222 A | * | 2/1992 | Shibuya | 250/234 |
| 5,751,475 A | * | 5/1998 | Ishiwata et al. | 359/387 |
| 5,969,853 A | * | 10/1999 | Takaoka | 359/370 |
| 6,278,100 B1 | * | 8/2001 | Friedman et al. | 250/201.9 |
| 6,317,261 B1 | * | 11/2001 | Otaki | 359/387 |
| 6,381,074 B2 | * | 4/2002 | Yoshida | 359/661 |
| 6,580,518 B2 | * | 6/2003 | Eda et al. | 356/609 |
| 6,741,356 B1 | * | 5/2004 | Ishiwata et al. | 356/491 |
| 2002/0110928 A1 | | 8/2002 | Yahiro | 436/518 |

FOREIGN PATENT DOCUMENTS

| JP | 8-122648 | 2/2003 |
| JP | 7-225341 | 5/2003 |
| JP | 2002 214228 | 11/2003 |

* cited by examiner

*Primary Examiner*—Thong Nguyen
(74) *Attorney, Agent, or Firm*—Kenyon & Kenyon LLP

(57) ABSTRACT

A microscope is provided that enables a phase object or surface pits and projections to be observed at a relatively low image-formation magnification of 4 or lower over a wide viewing range yet in a relatively narrow spatial frequency distribution range. The microscope comprises a light source, an illumination optical system, a partial aperture located at the pupil position of the illumination optical system, an image-formation optical system, and an eyepiece optical system or an image pickup optical system, wherein the diameter of the image of a partial aperture at the pupil position of the image-formation optical system is set smaller than the pupil diameter of the image-formation optical system, and at the pupil position of the image-formation optical system there is located an element for introducing in the pupil position of the image-formation optical system a wavefront varying in size with the pupil diameter.

20 Claims, 11 Drawing Sheets

28  26

27  28

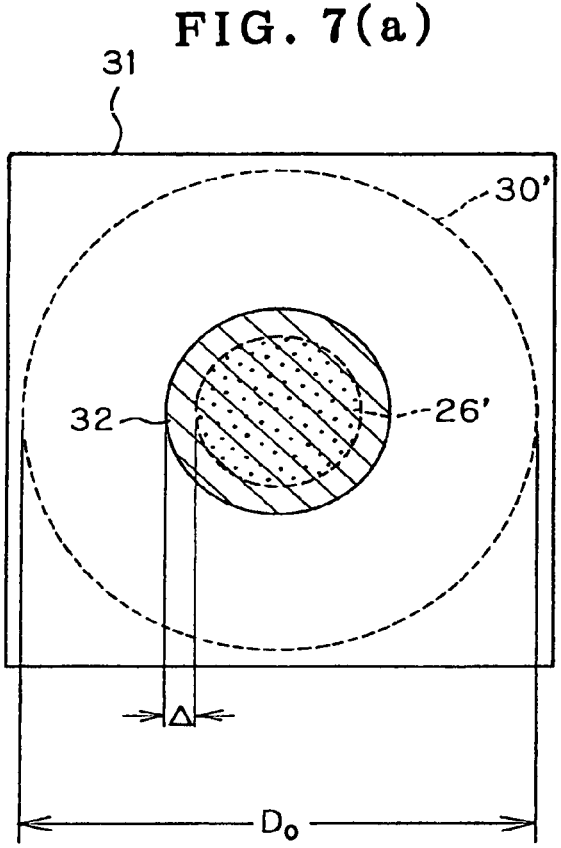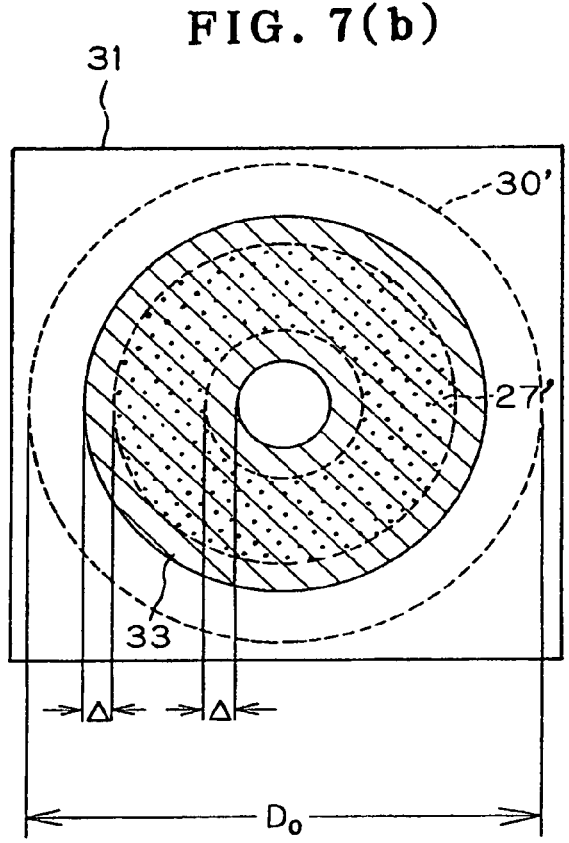

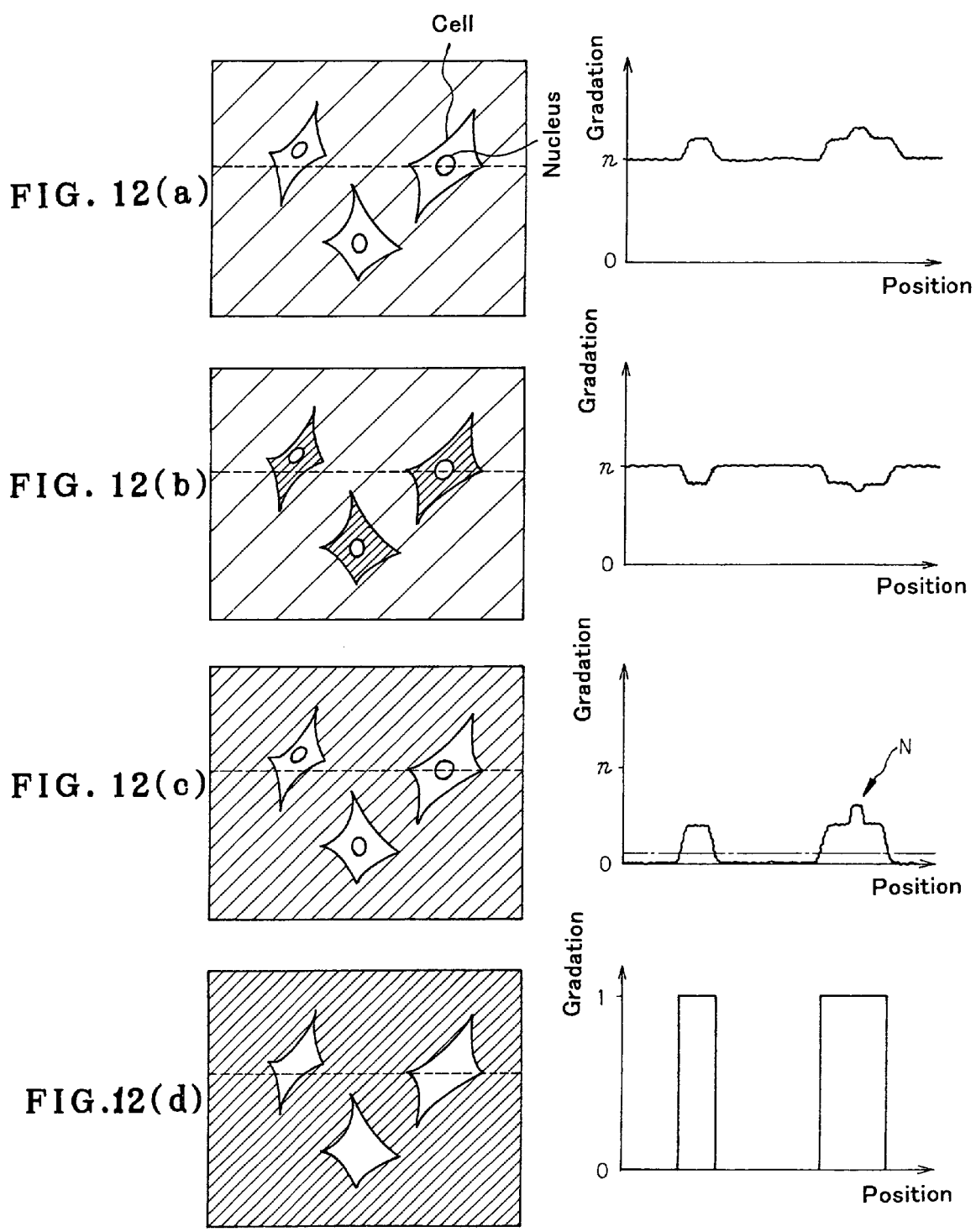

METHODS FOR IMPLEMENT MICROSCOPY AND MICROSCOPIC MEASUREMENT AS WELL AS MICROSCOPE AND APPARATUS FOR IMPLEMENTING THEM

This application claims benefit of Japanese Application No. 2003-414158 filed in Japan on Dec. 12, 2003 and No. 2004-30431 filed in Japan on Feb. 6, 2004, the contents of which are incorporated by this reference.

BACKGROUND OF THE INVENTION

The present invention relates generally to methods for implementing microscopy and microscopic measurements as well as a microscope and apparatus for implementing them. More particularly, the present invention relates to a method and microscope for observing phase objects such as living cells and minute pits and projections on semiconductor substrates, metal surfaces and glass substrates and a method and apparatus for measuring the number, morphology, distribution and so on of cells cultured in a culture vessel.

Living cells, being colorless and transparent, cannot be viewed through ordinary bright-field observations and, hence, are viewed by means of phase contrast microscopes or differential interference microscopes.

Like living cells, minute pits and projections occurring on semiconductor substrates or metal surfaces, too, are observed under differential interference microscopes, because of being incapable of bright-field observations.

As set forth typically in patent publication 1, a phase contrast microscope has a zonal aperture located at the pupil position of a condenser lens therein and a phase film that is similar in shape to the zonal aperture and is located at the pupil position of an objective lens conjugate to the zonal aperture via an object under observation, so that an image contrast proportional to the phase distribution of the phase object is obtainable.

As set forth typically in patent publication 2, a differential interference microscope has two doubly refracting prisms one located at the pupil position of a condenser lens and another at the pupil position of an objective lens with interference of orthogonal two polarized light components slightly displaced sideways, so that an image contrast proportional to the differentiated value of the phase distribution of a phase object is obtainable.

By the way, studies of growing and proliferating cells sampled from within a living body and applying grown cells to medical fields and pharmacometrics are now in the making.

Grown cells must be provided in a specific number and amount. So far, growing cells in a culture vessel have been observed under a microscope to visually measure how many cells are there and to what degree cells are growing. In another effort, images under observation are captured from a microscope in a CCD camera or the like and the images are processed to determine the number of cells (non-patent publication 3).

Patent Publication 1
JP(A) 7-225341
Patent Publication 2
JP(A) 8-122648
Patent Publication 3
JP(A) 2002-214228
Non-Patent Publication 1
"Optics", Vol. 30, No. 9 (2001), pp. 605 (33)-612 (40)
Non-Patent Publication 2
"Optics" by Hiroshi Kubota, pp. 300-304 (1964, Iwanami Shoten, Publishers)

In both the phase contrast microscope and the differential interference microscope, at the pupil position of each of an illumination optical system and an image-formation optical system there is located a device for the visualization of phase distributions. To this end, the illumination optical system must stay conjugate to the image-formation optical system. However, as the magnification of a viewing optical system goes down to make a viewing range wider, pupil aberration between the illumination optical system and the image-formation optical system becomes too large to keep the pupils in conjugate relations. This renders it difficult to use both the phase contrast microscope and the differential interference microscope for observations at magnifications lower than 4.

For instance, when living cells are observed during growing or minute pits and projections remaining on a semiconductor substrate surface, faster observations are necessary over a wide viewing range. However, both the phase contrast microscope and the differential interference microscope offer a problem in this regard.

Further, with living cells under observation by the phase contrast microscope, the coexistence of an intensity component that is not proportional to the phase difference of living cells and called a halo renders observations difficult. Furthermore, the coexistence of external perturbations such as illumination variations renders observations much harder.

With visual observations and measurements of growing cells in a culture vessel, there are problems such as longer time taken for measurements all over the culture vessel, differences from person to person, and lower repeatability.

In image processing, a cell portion is extracted depending on an image contrast difference between the cell portion to be detected and other cell-free portion. However, this is susceptible of influences by S/N changes of the detected image due to changes in the quantity distribution of illumination light or changes in viewing environments. There is another requirement that the viewing magnification be increased, ending up with another problem that the time for making measurements all over the culture vessel surface becomes long.

SUMMARY OF THE INVENTION

In view of such problems with the prior art as described above, one object of the invention is to provide a method for implementing microscopy which enables a phase object or surface pits and projections to be observed at a relatively low image-formation magnification of 4 or lower over a wide viewing range yet in a relatively narrow spatial frequency distribution range, and a microscope for carrying out that method.

Another object of the invention is to provide a method for implementing microscopy and microscopic measurements which enables the number, morphology, distribution, etc. of growing cells to be measured without affected by external perturbations as well as a microscope for carrying out that method and an apparatus for implementing microscopic measurements.

According to the invention, the above objects are accomplishable by the provision of a method for implementing microscopy, characterized in that a partial aperture is located at a pupil position of an illumination optical system in a microscope, an object under observation is illuminated by light passing through said partial aperture, and in a pupil position of an image-formation optical system there is introduced a wavefront varying in size with a pupil diameter to view an image formed on an image-formation plane of said image-formation optical system.

The invention also provides a method for implementing microscopy, characterized in that a substantial point light source that gives out divergent light is used as an illumination light source to form an image of said substantial point light source at a pupil position of an illumination optical system in a microscope, an object under observation is illuminated by the divergent light from the image of said substantial point light source, and in a pupil position of an image-formation optical system there is introduced a wavefront varying in size with a pupil diameter to view an image formed on an image-formation plane of said image-formation optical system.

Preferably in each method, the image-formation optical system should have an image-formation magnification of 4 or lower.

The wavefront to be introduced in the pupil position of the image-formation optical system may be either based on a displacement from the focus position of the image-formation optical system, or created by a variable-shape mirror that is located at the pupil of the image-formation optical system or at or near a position conjugate thereto.

When the partial aperture is located at the pupil position of the illumination optical system the partial aperture comprises a circular aperture or a zonal aperture, with satisfaction of condition (10):

$$D_0/10 \leq D_1 \leq D_0/3 \qquad (10)$$

where $D_1$ is the aperture width of an image at the pupil position of the image-formation optical system, and $D_0$ is the diameter of the pupil of the image-formation optical system.

It is preferable that an absorption film that conforms in shape to the image of the partial aperture or the substantial point light source at the pupil position of said image-formation optical system and is slightly larger than that shape is located at the pupil of said image-formation optical system or at or near a position conjugate thereto, with satisfaction of condition (11)

$$\Delta \leq D_0/10 \qquad (11)$$

where $\Delta$ is a margin width on the inner or outer peripheral side of the absorption film with respect to the image of the partial aperture or the substantial point light source at the pupil position of the image-formation optical system, and $D_0$ is the diameter of the pupil of the image-formation optical system.

While the wavefront introduced in the pupil position of the image-formation optical system is substantially symmetrically changed, two images with inverted contrasts are taken of the same object under observation, and a subtract operation is applied between the two images thereby providing an enhanced contrast.

The invention provides a microscope, comprising a light source, an illumination optical system for guiding light from the light source to an object under observation, a partial aperture located substantially at a pupil position of the illumination optical system and an image-formation optical system for forming on an image-formation plane an image of the object under observation illuminated by light passing through the partial aperture, and further comprising an eyepiece optical system or an image pickup optical system for viewing the image formed on the image-formation plane, characterized in that:

the diameter of an image of the partial aperture at the pupil position of the image-formation optical system is set smaller than the pupil diameter of the image-formation optical system, wherein at the pupil position of the image-formation optical system there is located wavefront introduction means for introducing in the pupil position of the image-formation optical system a wavefront varying in size with the pupil diameter.

The invention also provides a microscope, comprising a substantial point light source for giving out divergent light, an illumination light source for guiding light from the substantial light source to an object under observation while the image of the substantial point light source is once formed at a pupil position, and an image-formation optical system for forming on an image-formation plane an image of the object under observation illuminated by light from the substantial point light source, and further comprising an eyepiece optical system or an image pickup optical system for viewing the image formed on the image-formation plane, characterized in that:

the diameter of the image of the substantial point light source at the pupil position of the image-formation optical system is set smaller than the pupil diameter of the image-formation optical system, wherein at the pupil position of the image-formation optical system there is located wavefront introduction means for introducing in the pupil position of the image-formation optical system a wavefront varying in size with the pupil diameter.

Preferably in each microscope, the image-formation optical system should have an image-formation magnification of 4 or lower.

The wavefront introduction means may comprise either means for displacement and adjustment of the image-formation optical system in the optical axis direction or a variable-shape mirror that is located at the pupil of the image-formation optical system or at or near a position conjugate thereto, and has a variable or adjustable reflecting surface shape.

When the partial aperture is located at the pupil position of the illumination optical system the partial aperture comprises a circular aperture or a zonal aperture, with satisfaction of expression (10):

$$D_0/10 \leq D_1 \leq D_0/3 \qquad (10)$$

where $D_1$ is the aperture width of an image at the pupil position of the image-formation optical system, and $D_0$ is the diameter of the pupil of the image-formation optical system.

It is preferable that an absorption film that conforms in shape to the image of the partial aperture or the substantial point light source at the pupil position of said image-formation optical system and is slightly larger than that shape is located at the pupil of said image-formation optical system or at or near a position conjugate thereto, with satisfaction of condition (11)

$$\Delta \leq D_0/10 \qquad (11)$$

where $\Delta$ is a margin width on an inner or outer peripheral side of the absorption film with respect to the image of the partial aperture or the substantial point light source at the pupil position of the image-formation optical system, and $D_0$ is the diameter of the pupil of the image-formation optical system.

Preferable in one specific embodiment of the invention, the microscope should further comprise an image pickup optical system for picking up the image formed on the image-formation plane, an image pickup device located on the image pickup plane thereof, and operation and storage means for storing and operating the image picked up by the image pickup device.

With the methods for implementing microscopy and the microscopes as recited above, living cells or minute pits and projections on metal surfaces can be observed without recourse to phase contrast microscopes or differential interference microscopes. In particular, it is possible to observe phase distributions or pit-and-projection distributions at a relatively low image-formation magnification of 4 or lower at which conventional phase contrast microscopes or differential interference microscopes would run into difficulty. It is also possible to cancel out illumination variations or halo components, thereby obtaining an image intensity distribution of good contrast commensurate with the phase distribution or pit-and-projection distribution of an object under observation.

The invention provides a method for implementing microscopic measurements, characterized in that by means of a microscope that comprises an illumination optical system, a viewing optical system including a unit for converting an object under observation into a contrast image by interference and an image pickup device for capturing therein a contrast image having a phase difference of opposite sign upon interference of the image under observation, two images comprising contrast images having a phase difference of opposite sign are captured therein to apply a subtract operation to the captured two images to form an image subjected to the subtract operation, and at least one of the number of cells, the area taken up by cells, the abundance distribution of cells and the abundance density of cells in a viewing range is measured from the obtained image subjected to the subtract operation.

Preferably in this case, a portion having an intensity value of zero or nearly zero is extracted out of the intensity distribution of the image subjected to the subtract operation to take the portion as being a cell-free portion and other portion as being a cell-containing portion, thereby making a separation between the portions containing cells and no cells.

Alternatively, a portion having an intensity value of zero or nearly zero is extracted out of the intensity distribution of the image subjected to the subtract operation to allocate an intensity value to one value and other portion to another one intensity value for binarization.

The invention also provides a method of implementing microscopic measurements, characterized in that by means of a microscope that comprises an illumination optical system, a viewing optical system including a unit for converting an object under observation into a contrast image by interference and an image pickup device for capturing therein a contrast image having a phase difference of opposite sign upon interference of the image under observation, images comprising contrast images having a phase difference of opposite sign are captured therein to apply a subtract operation and an add operation to the captured two images to form two images wherein the image subjected to the subtract operation is divided by the image subjected to the add operation to measure information about the thickness of cells in a viewing range.

The invention provides an apparatus for implementing microscopic measurements, characterized by comprising a microscope that comprises an illumination optical system, a viewing optical system including a unit for converting an object under observation into a contrast image by interference and an image pickup device for capturing therein a contrast image having a phase difference of opposite sign upon interference of the image under observation, and a processing unit for capturing therein two images comprising contrast images having a phase difference of opposite sign to apply a subtract operation to the captured two images to form an image subjected to the subtract operation, so that at least one of the number of cells, the area taken up by cells, the abundance distribution of cells and the abundance density of cells in a viewing range is measured from the obtained image with the subtract operation applied thereto.

Preferably in this case, the apparatus should further comprise a separation unit for extracting a portion having an intensity value of zero or nearly zero out of an intensity distribution of the image subjected to the subtract operation to take the portion as being a cell-free portion and other portion as being a cell-containing portion, thereby making a separation between the portions containing cells and no cells.

Alternatively, the apparatus may further comprise a binarization unit for extracting a portion having an intensity of zero or nearly zero out of the intensity distribution of the image subjected to the subtract operation to allocate an intensity value to one value and other portion to another one intensity value for binarization.

The invention also provides an apparatus for implementing microscope measurements, characterized by comprising a microscope that comprises an illumination optical system, a viewing optical system including a unit for converting an object under observation into a contrast image by interference, and an image pickup device for capturing therein a contrast image having a phase difference of opposite sign upon interference of the image under observation, an operation unit for capturing therein two images comprising contrast images having a phase difference of opposite sign to apply a subtract operation and an add operation to the captured two images to form two images, and a thickness measurement unit for dividing the image subjected to the subtract operation divided by the image subjected to the add operation to measure information about the thickness of cells in the viewing range.

In one specific embodiment of the apparatus, an aperture is located substantially at the pupil position of the illumination optical system, and the viewing optical system including a unit for converting the object under observation into a contrast image by interference is constructed such that the image of the object under observation illuminated by the light passing through the aperture in the illumination optical system is capture by the image pickup device at positions displaced from the focus position toward the near point side and the far point side.

With the method and apparatus for implementing microscopic measurements as recited above, it is possible to form an image subjected to the subtract operation thereby obtaining image information of growing cells, which are less affected by external perturbations such as illumination variations. In particular, a portion with no cells distributed is little affected by external perturbations.

By carrying out the extraction of a cell-free portion at first, it is possible to make an easy separation between a cell-containing portion and the cell-free portion.

Further, if the cell-containing portion is separated from the cell-free portion for binarization, it is then possible to calculate the area taken up by cells. Furthermore, if the average area of cells is previously found, it is then possible to calculate the number of cells.

Also, if the quotient of the images subjected to the subtract operation and the add operation is found, it is then possible to calculate the height distribution of cells. Further, if a specific extraction range is set for binarization, it is then possible to extract cell nuclei and, hence, obtain information depending on the cell nuclei.

Sill other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 7(a) and 7(b) are illustrative of the configuration of an absorption film in an absorption film unit attached to or detached from the pupil plane of the objective lens with respect to the aperture shape of the aperture unit of FIG. 5.

FIGS. 12(a), 12(b), 12(c) and 12(d) are illustrative of how to measure states of growing cells according to the invention.

DESCRIPTION OF THE PREFERRED EMBODIMENTS

First of all, the principles of creating image contrasts proportional to the pit-and-projection phase distribution of a phase object or pits and projections on a substrate surface according to the invention are explained.

Figure 1:
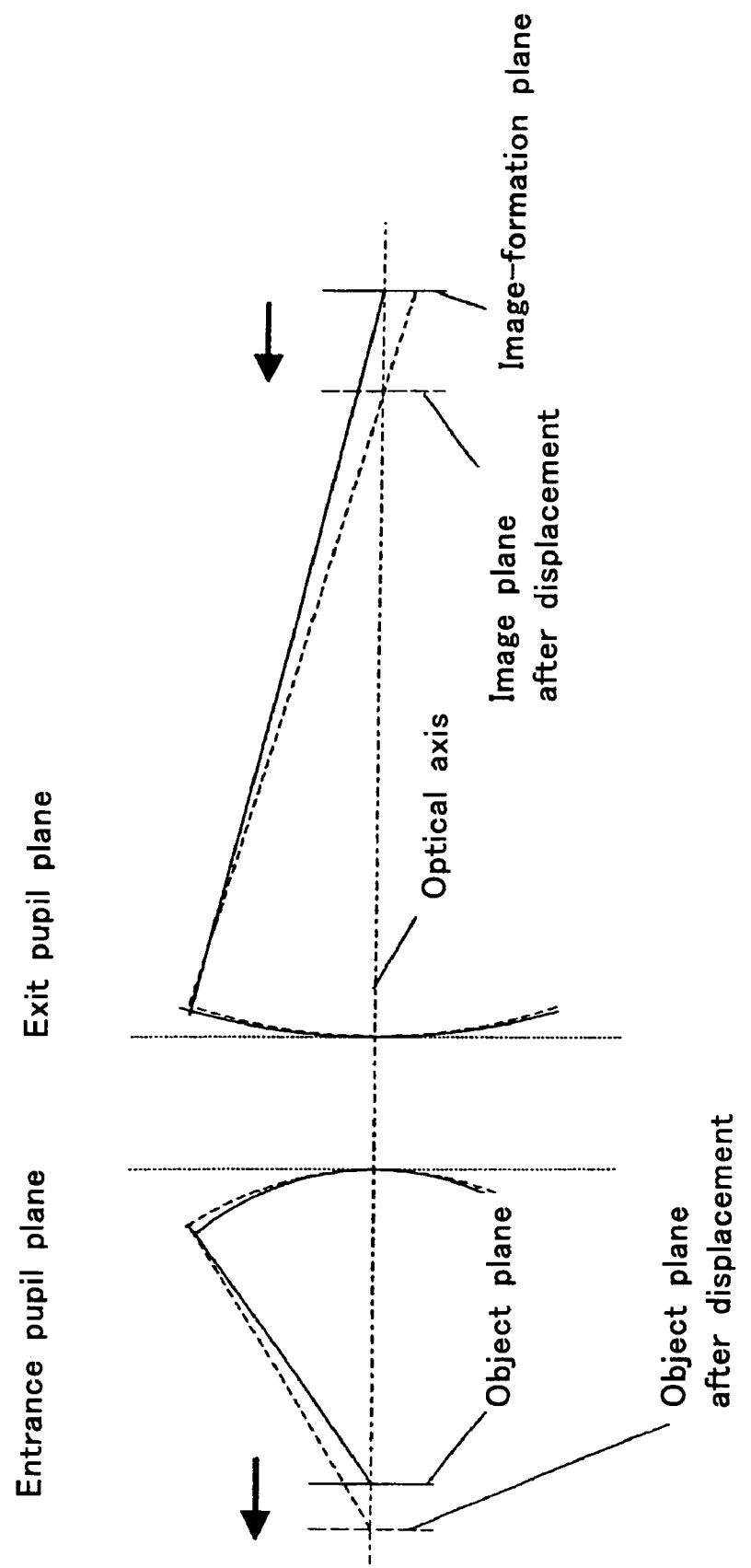
FIG. 1 is illustrative of the principles of the invention.

FIG. 1 is illustrative of the principles of the invention, and provides a schematic illustration of an arrangement comprising an object point and the entrance pupil, exit pupil and image-formation plane of an image-formation optical system. As an object under observation is located at a focus position as shown in FIG. 1, light coming out of an object point under observation spreads out in spherical waveform, entering the entrance pupil of the image-formation optical system, whence the incident light takes a spherical waveform of converging light, leaving the exit pupil of the image-formation optical system and converging on the image-formation plane to form an image thereon. The formed image is free from any blurring, because there is no optical path (phase) difference between light rays passing through the image-formation optical system.

As the object point is displaced to a position indicated by a dotted line, however, light from the object point enters the entrance pupil in spherical waveform. The light incident on the entrance pupil leaves the exit pupil, turning to a spherical waveform of light going toward the image plane after displacement. If observation is made on the image plane after displacement, there is no optical path (phase) difference in the light; however, if observation is made on the initial image-formation plane before displacement, there is an optical path (phase) difference in each light ray.

In the invention, this is utilized to locate the object under observation at a position off the focus position of the image-formation optical system to create phase differences in the respective light rays passing through the image-formation optical system.

Referring again to FIG. 1, there is the largest phase difference between an axial chief ray through the image-formation optical system and the maximum NA (numerical aperture) light ray.

Accordingly, if the object under observation is viewed at a position off the focus position of the image-formation optical system, it is then possible to create the amount of phase difference commensurate with the amount of displacement from the focus position (the amount of defocusing) between the light transmitted and the light diffracted through the object under observation.

Therefore, that amount of phase difference functions equivalently to a phase film used in phase contrast observations, so that colorless, transparent growing cells, etc. can be observed with an image contrast given in proportion to the phase distribution of growing cells.

It is then preferable to form an image on the image-formation plane of the image-formation optical system at a lower image-formation magnification, because it is easier to limit the angle of the diffracted light passing through the image-formation optical system, with a much improved image contrast.

When a phase object is observed, an image contrast proportional to its phase difference is proportional to the phase amount of the object under observation and the amount of a phase difference given between transmitted light and diffracted light. The angle between the light diffracted and the light transmitted through the object under observation varies with the shape of the object under observation. A change in the angle between the diffracted light and the transmitted light causes the amount of the phase difference occurring between two light beams to differ even at the same amount of defocusing. Therefore, if, for instance, the amount of defocusing is changed for each cell under observation, it is then possible to obtain much better image contrasts.

The phase difference of each light ray occurring by defocusing is of varying sign between displacements of the object under observation from the focus position of the image-formation optical system toward a near point side and a far point side. In images of growing cells or other object under observation, obtained at positions displaced from the focus position of the image-formation optical system toward the near point side and the far point side, their image contrasts are inverted in correspondence to the phase difference of the object under observation.

A light-absorbing object such as dust deposited onto a laboratory dish or the like can no longer behave as a phase object, and there is no change in the image contrast even when a phase difference is given thereto by defocusing. Thus, if an inter-image operation is applied to an image picked up at a position displaced toward the near point side and an image picked up at a position displaced toward the far point side, it is then possible to isolate an image component that is not affected by the phase difference given by defocusing. Especially if a subtract operation is applied to each pixel of two images, it is then possible to double the image contrast of an image component commensurate with the phase distribution of the object under observation, thereby eliminating an image component bearing no phase information about dust, foreign matters, illumination variations, etc.

It is noted that the above phase object-viewing method is particularly useful in applications where the presence of phase objects in the field must be recognized through an image-formation optical system having an image-formation magnification of 4 or lower.

The above principles are now explained with a little bit of theory.

The formation I(x) of an image of a phase substance:

$$a(U)=\exp\{-i\phi(U)\} \quad (1)$$

by partially coherent light is given by expression (6) referred to in non-patent publication 1, specifically by the following expression. It is herein noted that the expression numbers do not correspond to those in non-patent publication 1.

$$I(x) = \left[T(0,0) - \right. \quad (2)$$
$$\frac{1}{2}\int_{-\infty}^{\infty}\{T(f,0)+T(0,-f)\}\exp(-2\pi ifx)\Phi(f)\otimes\Phi^*(f)df\right] +$$
$$\left[i\int_{-\infty}^{\infty}\{T(f,0)-T(0,-f)\}\Phi(f)\exp(-2\pi ifx)df\right] +$$
$$\left[\int_{-\infty}^{\infty}T(f,f)\Phi(f)\Phi^*(f)df + \right.$$
$$\left.\int_{-\infty}^{\infty}T(f,-f)\Phi(f)\Phi^*(-f)\exp(-4\pi ifx)df\right]$$

In expression (2), the encircled cross symbol (the first term on the right side) is a convolution. It is noted that U, $f_i$ (i=1, 2) and x are coordinates on an object plane, a pupil plane and an image plane, respectively, and $\phi(U)$ is the phase information of an object under observation.

Here $\Phi(f)$ is a Fourier transformation of $\phi(U)$, and $T(f_1, f_2)$ is given by expression (2) referred to in non-patent publication 1, called the spatial frequency characteristics (or TCC (transmission cross coefficient) given by $$T(f_1, f_2) = \int_{-\infty}^{\infty} S(\xi)P(f_1+\xi)P^*(f_2+\xi)d\xi \quad (3)$$

Here $S(\xi)$ is indicative of the intensity distribution of the pupil of the illumination optical system, and $P(\xi)$ is representative of the pupil function of the image-formation optical system, where $\xi$ is position coordinates in the pupil.

Given an aberration-free optical system, $P(\xi)$ is a function indicative of a pupil area, given by $$P(\xi) = p(\xi) \quad (4)$$

$$\text{Here, } p(\xi) = \begin{cases} 1 & (|\xi| \leq a, : \text{pupil radius}) \\ 0 & (\text{Other}) \end{cases}$$

When there is defocus or other aberration $W(\xi)$ (expressed by a phase amount) in the image-formation optical system, $$P(\xi)=\exp\{-iW(\xi)\}\cdot p(\xi) \quad (5)$$

Of the above expression (2), the first and third terms on the right side are higher-order terms with respect to the phase $\phi(U)$, and the second term gives an image contrast proportional to the phase distribution $\phi(U)$. Then, transformation of the second term of expression (2) gives $$T(f,0) - T(0,-f) = -2i\int_{-\infty}^{\infty}\{W(\xi+f)-W(\xi)\}S(\xi)p(\xi)p(\xi+f)d\xi \quad (6)$$

on condition that the amount of aberration $W(\xi)$ is small and rotationally symmetric, and the function $p(\xi)$ indicative of the pupil area of the image-formation optical system is rotationally symmetric.

From the second term of expression (2) and expression (6), it is understood that when the phase object is viewed, the phase distribution can be visualized by offering defocus or other aberration in such a way as to allow expression (6) to have a value other than zero.

For a better understanding of the expansion of expressions, the expansion is performed with one-dimensional variables in the foregoing; however, the same also holds for expansion with two-dimensional variables.

Figure 2A:
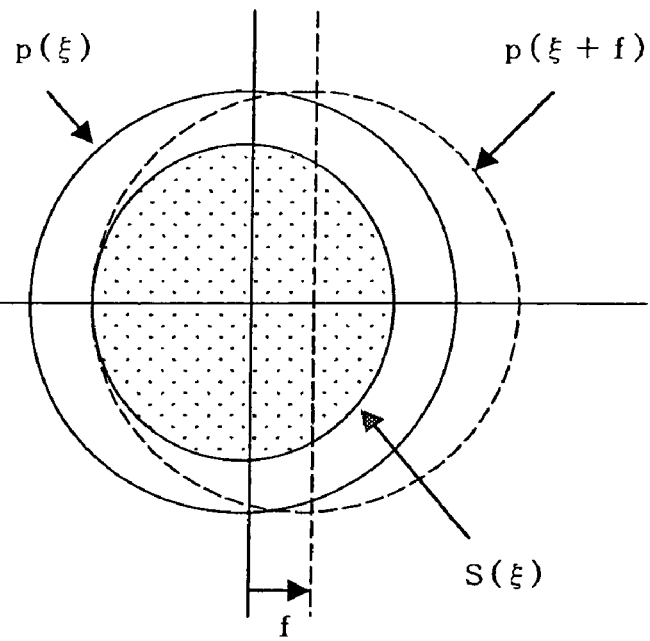
FIGS. 2(a) and 2(b) are illustrative of the special frequency characteristics of partially coherent image formation.
Figure 2B:
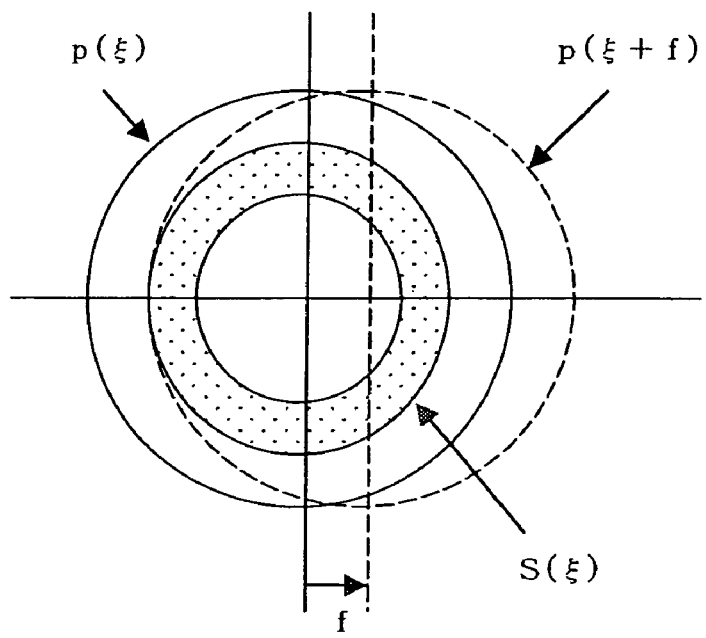
Figure 3A:
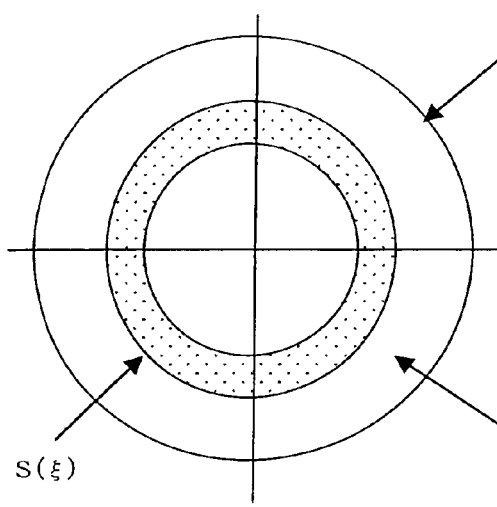
FIG. 3 is illustrative of an image (a) of the pupil of an illumination optical system formed by light that is not diffracted by an object at the pupil of an image-formation optical system and an image (b) of the pupil of the illumination optical system formed by light that is subjected to first-order diffraction by the object at the pupil of the image-formation optical system in the case where the pupil of the illumination optical system is of zonal shape.
Figure 3B:
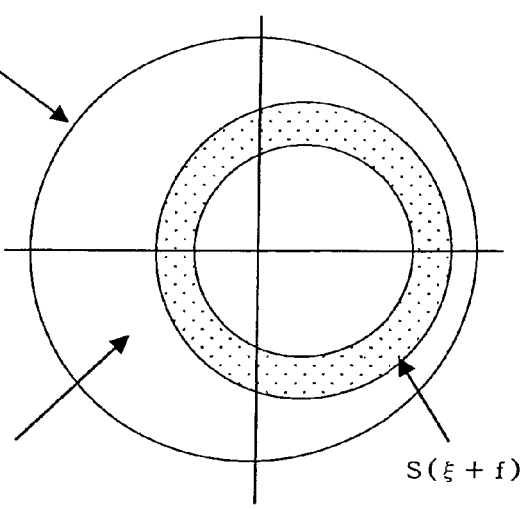

Schematic illustrations of expression (6) with the pupil of the illumination optical system and the pupil of the image-formation optical system are presented in FIGS. 2(*a*) and 2(*b*). Here FIGS. 2(*a*) and 2(*b*) illustrate that the intensity distribution (aperture shape) $S(\xi)$ of the pupil of the illumination optical system has a circular shape and a zonal shape, respectively, and show displacements of the pupil of the image-formation optical system by diffraction through the object. Referring here to the case where the illumination optical system has a zonal pupil, the pupil $S(\xi)$ of the illumination optical system is displaced as illustrated in FIGS. 3(*a*) and 3(*b*) with an interchanged coordinate system. FIG. 3(*a*) is the (hatched) portion to be calculated with respect to $W(\xi)$ of expression (6), and FIG. 3(*b*) is the (hatched) portion to be calculated with respect to $W(\xi+f)$. More specifically, FIG. 3(*a*) corresponds to the image by light not diffracted through the object of the pupil of the illumination optical system at the pupil of the image-formation optical system, and FIG. 3(*b*) corresponds to the image by light subjected to first-order diffraction through the object of the pupil of the illumination optical system at the pupil of the image-formation optical system.

Therefore, if the aberration $W(\xi)$ at the pupil position of the image-formation optical system is rotationally symmetric and varies in size with radius, it is then possible to visualize the phase distribution.

Consider here $W(\xi)$ upon defocusing. Wave aberration due to defocusing is given by $$\Delta L = -h^2 z/f^2 \quad (7)$$

where h is the height of a light ray in the pupil plane, f is the focal length of a lens, z is the amount of defocusing, and $\Delta L$ is the optical path length at each point on the pupil, as set forth in non-patent publication 2. The value of h/f is indicative of a position on the pupil, equivalent to $\xi$ indicative of position coordinates in the pupil. $\Delta L$, because of being an optical path length difference at the position $\xi$, is given by $$\Delta L = W(\xi) \times \lambda = -\xi^2 z \quad (8)$$

where $\lambda$ is a wavelength. Therefore, $$W(\xi) = -\xi^2 x/\lambda \quad (9)$$

That aberration $W(\xi)$ due to defocusing is rotationally symmetric and increases in the minus direction in proportion to the square of radius and, hence, can give an image contrast proportional to the phase distribution.

Here in the coordinates for z, the right and left sides of FIG. 1 are generally positive and negative with respect to the focus position. Therefore, the sign of $W(\xi)$, too, varies between defocusing from the focus toward the left (far point) side and defocusing from the focus toward the right (near point) side.

From the above discussions, it is evident that the aberration $W(\xi)$ is also achievable by means of optical means, not by means of defocusing, which optical means gives wave aberration that is likewise rotationally symmetric on the pupil plane and has size varying with radius (such as a variable-shape (deformable) mirror that will be specifically referred to later).

Some examples of the microscope for reducing such principles down to practice according to the invention are now explained.

Figure 4:
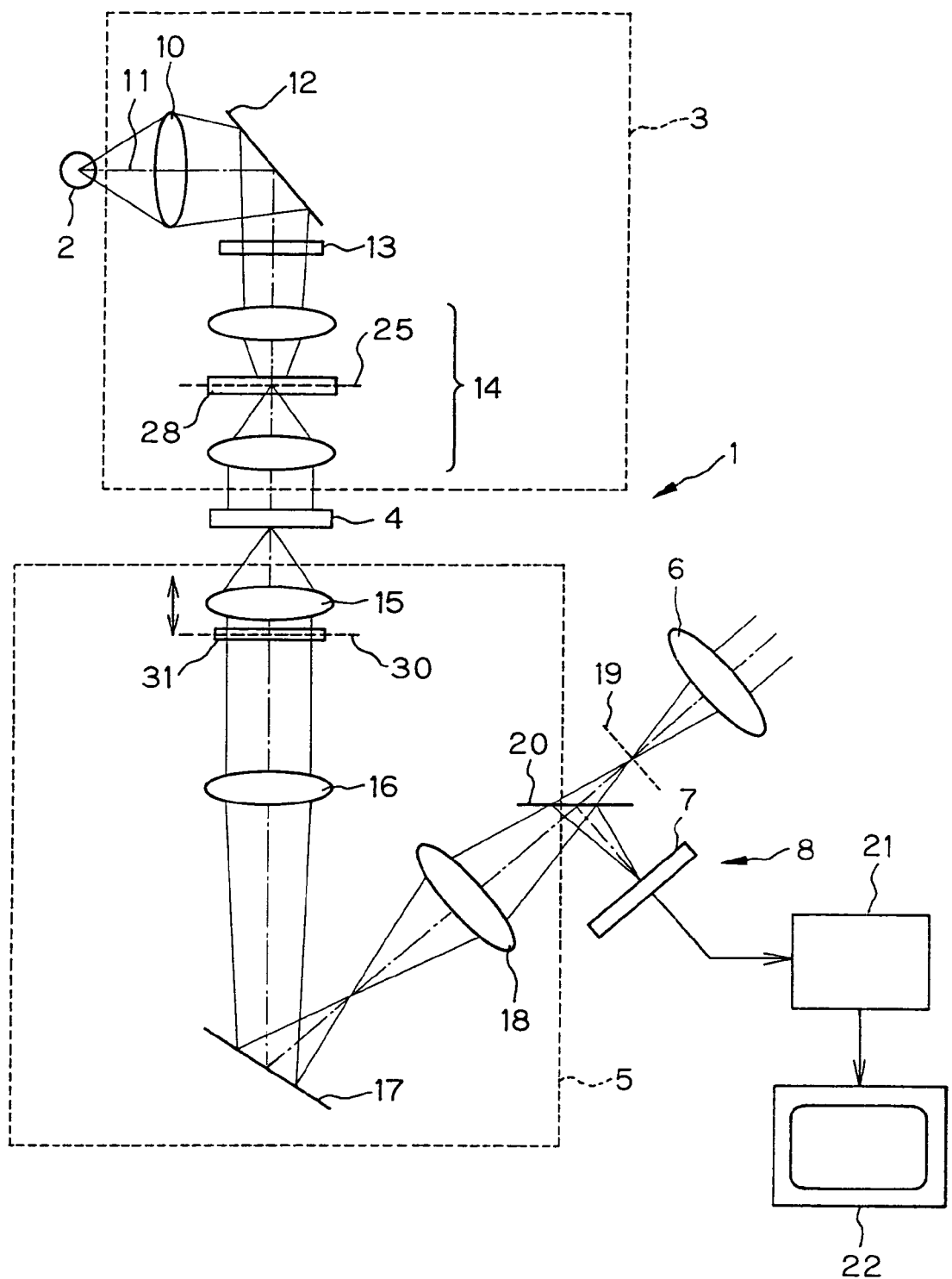
FIG. 4 is illustrative in schematic of one example of the inverted microscope according to the invention.

FIG. 4 is illustrative in schematic of the inverted microscope of one example according to the invention. This inverted microscope shown generally at 1 is made up of a light source 2, an illumination optical system 3 for guidance of light emanating from light source 2, a viewing optical system 5 for forming the image of an object 4 under observation, an eyepiece lens 6 for magnifying the image of object 4 for visual observation, and a CCD camera 8 including an image pickup device 7 for picking up the image of object 4. The CCD camera 8 is further connected with a personal computer 21 for storage and operation of picked-up images and a TV monitor 22.

The illumination optical system 3 is built up of, in order from the side of light source 2, a collector lens 10, a deflecting mirror 12 for deflection of the optical axis 11 of illumination light, an interference filter 13 for turning light from the light source 2 into quasi-monochromatic light, and a condenser lens 14.

The viewing optical system 5 is constructed of, in order from the side of object 4 under observation, an objective lens 15 for forming the image of object 4, a first relay lens 16, a deflecting mirror 17 for deflection of light from the objective lens 15, and a second relay lens 18 for cooperating with the first relay lens 17 to form the image of the objective lens 15 (the image of object 4) on an image-formation plane.

Between the second relay lens 18 and the image-formation plane 19 there is interposed a switchover mirror 20 that is a half-silvered mirror for visually observing the image of object 4 by the eyepiece lens 6 and the CCD camera 8 or switching the visual observation of the image of object 4 by the eyepiece lens 6 over to that by the CCD camera 8 and vice versa.

Figure 5A:
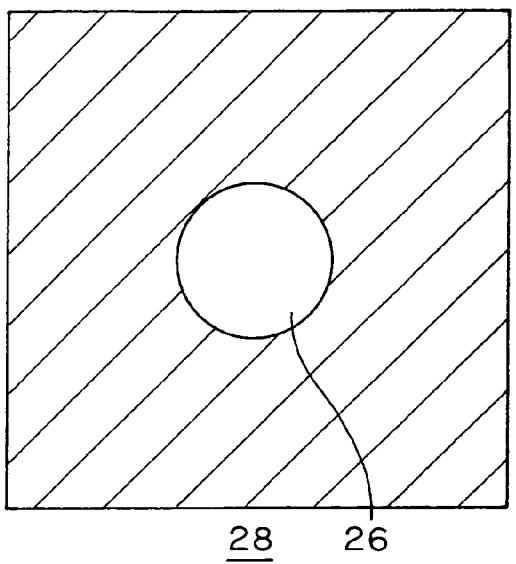
FIGS. 5(a) and 5(b) are illustrative of exemplary aperture shapes of the aperture unit attached to or detached from the pupil position of a condenser lens.
Figure 5B:
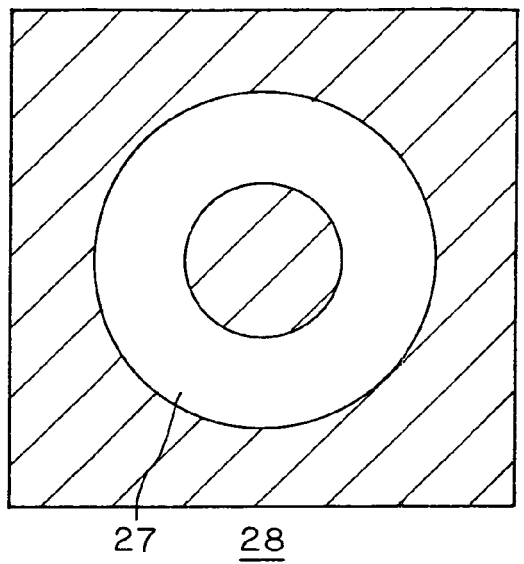

At the pupil position 25 of the condenser lens 14 onto which light from the light source 2 is projected, there is detachably located an aperture unit 28 that includes a circular aperture 26 shown in FIG. 5(a) or a zonal aperture 27 shown in FIG. 5(b). The aperture 26, 27 per se is located coaxially with respect to the center of the pupil. The aperture unit 28 is formed of a shading plate except the aperture 26, 27.

Figure 6A:
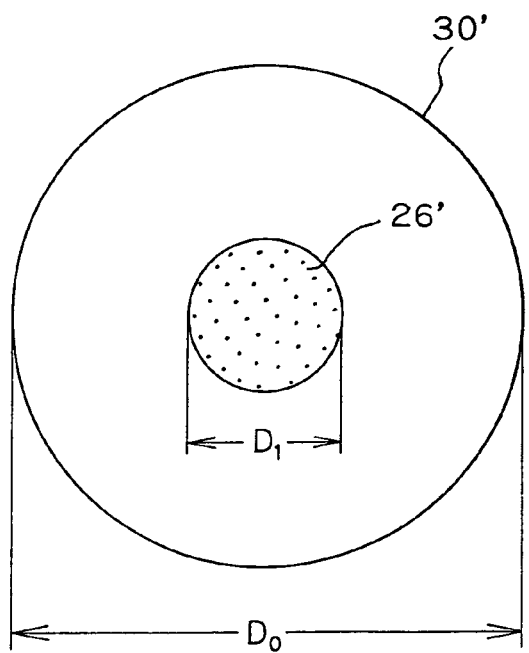
FIGS. 6(a) and 6(b) are illustrative of an image of the aperture of FIG. 5 as projected onto the pupil plane of an objective lens.
Figure 6B:
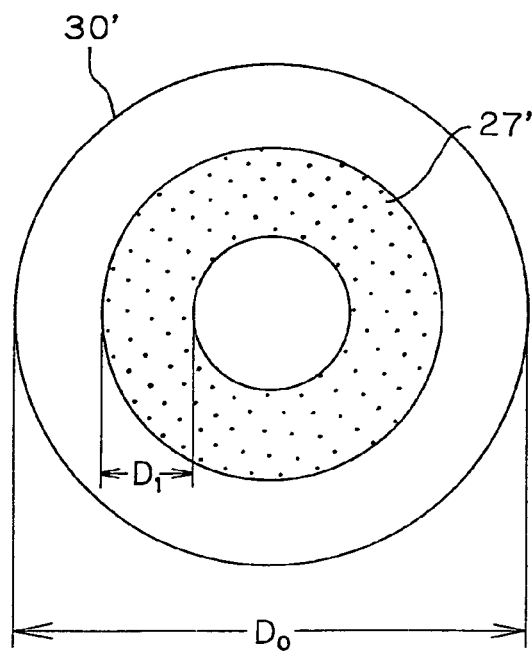

Here the aperture 26, 27 should preferably satisfy the following condition (10) while projected onto the pupil plane 30 of the objective lens 15 in the form of an aperture image 26', 27' as shown in the form of an image on the pupil image 30 of the objective lens 15 in FIGS. 6(a) and 6(b).

$$D_0/10 \leq D_1 \leq D_0/3 \tag{10}$$

Here $D_0$ is the diameter of the pupil 30' of the objective lens 15, $D_1$ is the aperture width (diameter) of the image 26' of the circular aperture 26 on the pupil plane 30 of the objective lens 15, or $D_1$ is the aperture width of the image 27' of the zonal aperture 27 on the pupil plane 30 of the objective lens 15. What is here implied will be described later.

Further, an absorption film unit 31 is detachably located on the pupil plane 30 of the objective lens 15. The absorption film unit 31 includes an absorption film that conforms in shape to the image of the aperture in the aperture unit 28 on the pupil plane and is slightly larger in size than that shape. More specifically, FIG. 7(a) shows the shape of an absorption film 32 on the absorption film unit 31 commensurate with a circular aperture 26 in the aperture unit 28, and FIG. 7(b) shows the shape of an absorption film 33 on the absorption unit 31 commensurate with a zonal aperture 27 in the aperture unit 28. As shown in FIGS. 7(a) and 7(b), the shape of the absorption film 32, 33 provided on the absorption unit 31 is circular in the case where the aperture 26 in the aperture unit 28 is circular, and zonal in the case where the aperture 27 in the aperture unit 28 is zonal. In addition, the absorption film 32 is formed with a margin width $\Delta$ on the outer peripheral side of the image 26' of the aperture 26 on the pupil plane 30 of the objective lens 15. Likewise, the absorption films 33 are formed with margin widths $\Delta$ on the outer and inner peripheral sides of the image 27' of the aperture 27 on the pupil plane 30 of the objective lens 15. Preferably, that margin width should satisfy $$\Delta \leq D_0/10 \tag{11}$$

What is here implied will be described later.

With the instant example set up as described above, illumination light from the light source 2 is projected onto the pupil position of the condenser lens 14. Then, this illumination light cooperates with the condenser lens 14 to illuminate the object 4 under observation in the form of Koëhler illumination. Upon illumination of the object 4, the light passes through the object 4, entering the objective lens 15 so that the objective lens cooperates with the first relay lens 16 and the second relay lens 18 to form the image of the object 4 under observation on an image-formation plane 19. The image of the object 4 formed on the image-formation plane 19 enters the eyepiece lens 6, forming an image on the image pickup plane of the image pickup device 7 in the CCD camera 8 by way of the switchover mirror 20. Thus, the object 4 can be observed at the focus position as usual.

On the other hand, when the aperture unit 28 is located at the pupil position of the condenser lens 14, the image 26' of the circular aperture 26 or the image 27' of the zonal aperture 27 in the aperture unit 28 is projected onto the pupil plane 30 of the objective lens 15 in such a way as to be coaxial with its pupil 30', as shown in FIG. 6.

Here the illumination light passing through the circular aperture 26 or the zonal aperture 27 in the aperture unit 28 is entered in the object 4 under observation, e.g., a growing living cell having three-dimensional sizes, where it is broken down into transmitted light, refracted light and diffracted light, leaving the cell. When the contour of the cell is close in shape to a sphere or ellipsoid, more light is subject to refraction, and when the contour of the cell is flat, more light is subject to transmission and diffraction. Some light refracted at a spherical or ellipsoidal portion of the cell is larger than the NA of the objective lens 15, and so is not captured in the objective lens 15.

In this example, defocusing is carried out by adjusting a collimator mechanism (focus adjuster mechanism) suffixed to the microscope to effect a minute amount of back or fore displacement of the optical axis position of the objective lens 15 from a position that is regarded as a focus position for ordinary observations with respect to the object 4 under observation. With the application of defocusing, the illumination light passing through the circular aperture 26 or the zonal aperture 27 in the aperture unit 28 behaves such that the light diffracted and the light transmitted through the object 4 pass through different portions in the pupil 30' of the objective lens 15 (see FIG. 3). Between the transmitted light beam and the diffracted light beam there is a phase difference that corresponds to the angle of diffraction and the amount of a wavefront change based on defocusing. That phase difference acts as is the case with a phase film in a phase contrast microscope, forming on the image-formation plane 19 an image intensity distribution proportional to the phase distribution of the object 4 under observation.

The amount of the back or fore displacement of the objective lens 15 must be such that the formed image is free of blurring. To put it another way, that amount should preferably be smaller than the value obtained by dividing the wavelength of the light source 2 used for observations by the square of the NA of the objective lens 15 used.

As already mentioned, the aperture width D, of the image 26' of the circular aperture 26 in the aperture unit 28 on the image plane 30 or the image 27' of the zonal aperture 27 (the diameter of the circular aperture 26) with respect to the diameter $D_0$ of the pupil 30' of the objective lens 15 should preferably satisfy condition (10). In this connection, it can be appreciated from the above expression (6) that at a site where the transmitted light and the diffracted light overlap in the pupil 30', the phase difference amount becomes zero at which there is no image intensity distribution in the phase object. In other words, as the aperture width of the image 26' or 27' of the aperture is too large with respect to the diameter $D_0$ of the pupil 30', the value of expression (6) approximates to zero; the upper limit to that aperture width is set at about ⅓ of the diameter $D_0$ of the pupil 30'.

As the aperture width of the image 26' or 27' of the aperture is too small, conversely, the quantity of light available for image observations becomes insufficient to observe bright images; the lower limit thereto is set at about 1/10 of the diameter $D_0$ of the pupil 30'.

The principles of making a phase object visible according to the invention are that in forming the image of the phase object by interference of zero-order transmitted light with ± first- or higher-order diffracted light through the phase object, a phase difference is given to the diffracted light with respect to the transmitted light to obtain an image intensity distribution. For this reason, as the amplitude of the transmitted light is relatively too large, there is a lowering of the contrast of the image of the phase object to be visualized due to too bright a background. However, if the amplitude of the transmitted light is selectively decreased, it is then possible to make better the contrast of the image intensity distribution formed by interference with the diffracted light. It is thus desired to provide such an absorption film unit 31 shown in FIG. 7(a) or 7(b) on the pupil plane 30 of the objective lens 15, thereby absorb therein a part of the light transmitted through the object 4 under observation without undergoing diffraction. It is then desired that the absorption film 32 or 33 on the absorption film unit 31 be formed on the outer peripheral side of the aperture width of the image 26' of the aperture 26 with a margin width Δ or on the outer and inner peripheral sides of the aperture width of the image 27' of the aperture 27 with margin widths Δ in such a way as to satisfy condition (11). That is, at and near the image 26' or 27' of the aperture 26 or 27 formed by the transmitted light on the pupil plane 30 of the objective lens 15, there is an area that mainly receives light due to the gradients of the refracting or reflecting facets of the object 4 under observation with a phase distribution (in the case of such a reflecting microscope as will be described later). Thus, if the margin width Δ of up to about $D_0/10$ is given to the outer peripheral side of the aperture width of the image 26' of the aperture 26 or the outer and inner peripheral sides of the aperture width of the image 27' of the aperture 27, the components of light due to refraction or reflection can then be effectively reduced with having little or no influence on the image intensity distribution of the phase distribution formed by the light diffracted through the object 4 under observation.

To obtain such effects, the absorption film 32, 33 should preferably have a transmittance in the range of 10% to 30%.

As already described, the phase difference caused by defocusing is of varying sign between displacements of the object 4 under observation from the focus position of the objective lens 15 toward a near point side and a far point side. In images of growing cells or other object under observation, obtained at positions displaced from the focus position of the objective lens 15 toward the near point side and the far point side, their image contrasts are inverted in correspondence to the phase difference of the object 4 under observation. Therefore, if a subtract operation is applied to each pixel of two images picked up by the CCD camera 8 at positions displaced toward the near and far point sides and captured in the personal computer 21, it is then possible to double the image contrast of an image component commensurate with the phase distribution of the object 4 under observation. It is also possible to obtain only the image intensity distribution corresponding to the phase distribution of the object 4 under observation, because the halo component of the image component having no phase information about dust, foreign matters, illumination variations, etc. that are not affected by wavefront changes is canceled out down to zero.

In the above example, defocusing relying upon the collimator mechanism of the microscope is utilized to create a phase difference between the light diffracted and the light transmitted through the object 4 under observation in the pupil 30' of the objective lens 15. As already described, however, it is also possible to introduce the phase difference in the position of the pupil 30' of the objective lens 15 between the diffracted light and the transmitted light by means of the variable-shape mirror (deformable mirror), not by means of defocusing. This is illustrated in FIG. 8 that is similar to FIG. 4.

Figure 8:
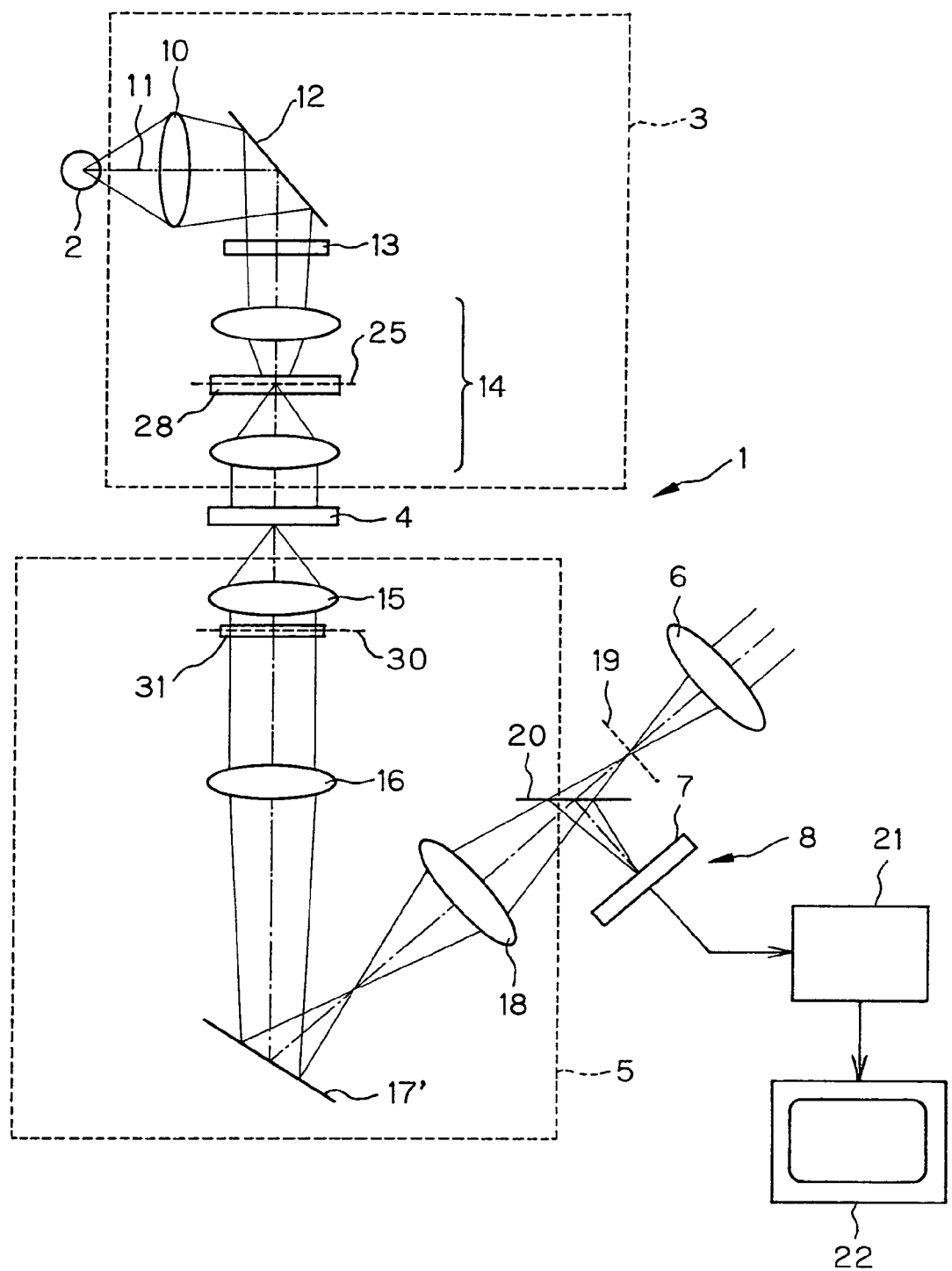
FIG. 8 is illustrative in schematic of one example of the inverted microscope using a variable-shape mirror, similar to FIG. 4.

The example of FIG. 8 is different from that of FIG. 1 primarily in that a variable-shape mirror 17' is located instead of the deflecting mirror 17 of FIG. 4. The variable-shape mirror 17' is located at a position conjugate to the pupil plane 30 of the objective lens 15 via the first relay lens 16. If this variable-shape mirror 17' is used to create rotationally symmetric, variable wave aberration that is proportional to, for instance, the square of radius with respect to the optical axis, as is the case with defocusing, it is then possible to create a phase difference between the diffracted light and the transmitted light, as is the case with defocusing relying upon the collimator mechanism, so that an image intensity distribution proportional to the phase distribution of the object 4 under observation can be formed in the image-formation plane 19. It is here noted that for the creation of rotationally symmetric wave aberration at the pupil plane 30, it is only needed to asymmetrically deform the decentered variable-shape mirror 17' in such a way as to compensate for its decentration.

In this case, too, a change in the angle between the diffracted light and the transmitted light causes the amount of phase difference created between the two light beams to vary even at the same amount of deformation of the variable-shape mirror 17'. For instance, it is thus possible to obtain better image contrasts by varying the amount of the deformation for each cell under observation.

The phase difference of each light ray caused by the deformation of the variable-shape mirror 17' is of varying sign between when the deformation of the variable-shape mirror 17' occurs at a position displaced toward the side of the objective lens 15 and when it occurs at a position displaced toward the side of the eyepiece lens 6. In images of growing cells or other object 4 under observation, obtained at positions displaced toward the side of the objective lens 15 and the side of the eyepiece lens 6, their image contrasts are inverted in correspondence to the phase difference of the object 4 under observation.

In this example, too, the absorption film unit 31 is located on the pupil plane 30 of the objective lens 15 to absorb a part of the zero-order transmitted light through the object 4 under observation as in the example of FIG. 4, thereby improving the contrast of the image of the phase object to be visualized.

In this example, too, it is desired to satisfy conditions (10) and (11).

It is here noted that even when, instead of locating the absorption film unit 31 on the pupil plane 30 of the objective lens 15, an absorption film similar in shape to the absorption film 32 or 33 (when the image-formation magnification of the image of the pupil 30' by the first relay lens 16 is not 1, the shape of the absorption film 32 or 33 must be multiplied by that magnification) is provided on the reflecting surface of the variable-shape mirror 17' located at a position conjugate to the pupil plane 30 of the variable-shape mirror 17', similar effects are achievable. However, it is desired that the transmittance of that absorption film be in the range of 20% to 60% that is approximately twice as high as that of the film 32 or 33, because light passes twice through the absorption film provided on the front side of the reflecting surface.

With the example of FIG. 8, control of the deformation of the variable-shape mirror 17 is faster than collimation control of the objective lens 15 as compared with the example of FIG. 4, so that faster and more real-time visualization of the phase distribution is achievable.

Both the examples of FIG. 4 and FIG. 8 take it for granted that a light source having a certain area, like a halogen lamp, is used as the light source 2 for illumination. The example shown in FIG. 9, on the other hand, depends on the supposition that an LED 2' is used as the light source 2 for illumination. The LED 2' is regarded substantially as a point light source that produces substantially monochromatic, divergent light; in this example, an illumination optical system 3 is built up of a collector lens 10, a deflecting mirror 12 for deflecting the optical axis 11 of illumination light and a condenser lens 14, so that light from the LED 2' is focused on the pupil position of the condenser lens 14.

The instant example is different from that of FIG. 4 in that the aperture unit 28, i.e., the circular aperture 26 or the zonal aperture 27 is not located at the pupil position 25 of the condenser lens 14, and is otherwise the same as that of FIG. 4.

This is because the LED 2' is thought of as a substantial point source and so is the image of the LED 2' formed at the pupil position 25 of the condenser lens 14; the contour of the image of that LED 2' plays a role equivalent to the aperture 26 or 25. Since the image of the LED 2' formed in the pupil 30' of the objective lens 15 is also regarded substantially as a point, the light transmitted and the light diffracted through the object 4 under observation hardly overlap in the pupil 30', and so contribute to the effective creation of the image intensity distribution of the phase object. In addition, nearly all of the light diverged from the LED 2' and captured in the collector lens 10 is utilized for the illumination of the object 4 under observation, thereby ensuring observation of bright images. It is here desired that the image of the LED 2' be formed at the pupil position 25 of the condenser lens 14 with a reduced magnification, because a diverging light beam from the LED 2' can be converted into one having an angle of divergence large enough to illuminate a wide surface of the object under observation, and the image of the LED 2' formed in the pupil 30' of the objective lens 15 can be much more reduced in size.

In the instant example, it is desired that the absorption film provided on the absorption film unit 31 be configured in conformity with the image of the LED 2' in the pupil 30', and be provided therearound with a margin width $\Delta$ in such a way as to satisfy condition (11).

Figure 9:
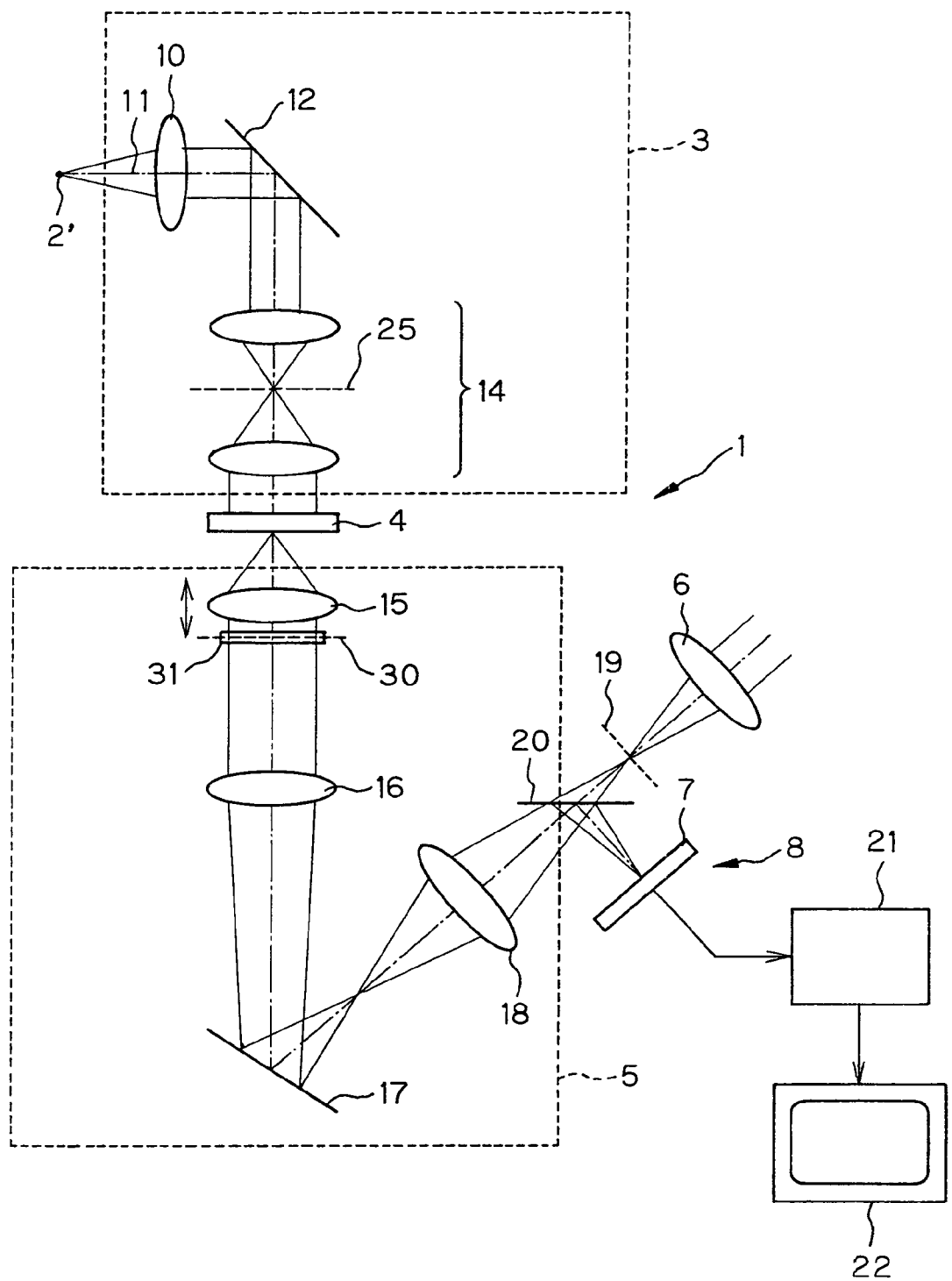
FIG. 9 is illustrative in schematic of one example of the inverted microscope using an LED as an illumination light source, similar to FIG. 4.

In the instant example, too, it is acceptable to visualize the phase distribution by deforming the variable-shape mirror 17', not the deflecting mirror 17 of FIG. 9, located at a position conjugate to the pupil plane 30 of the objective lens 15 as in the example of FIG. 8 instead of effecting defocusing with the collimator mechanism of the microscope.

By the way, the microscope according to the invention may also be applied to a reflecting microscope like a metallurgical microscope. A typical example of the phase distribution to be visualized on the principles of the invention is minute pits and projections found on a semiconductor or metal substrate.

Figure 10:
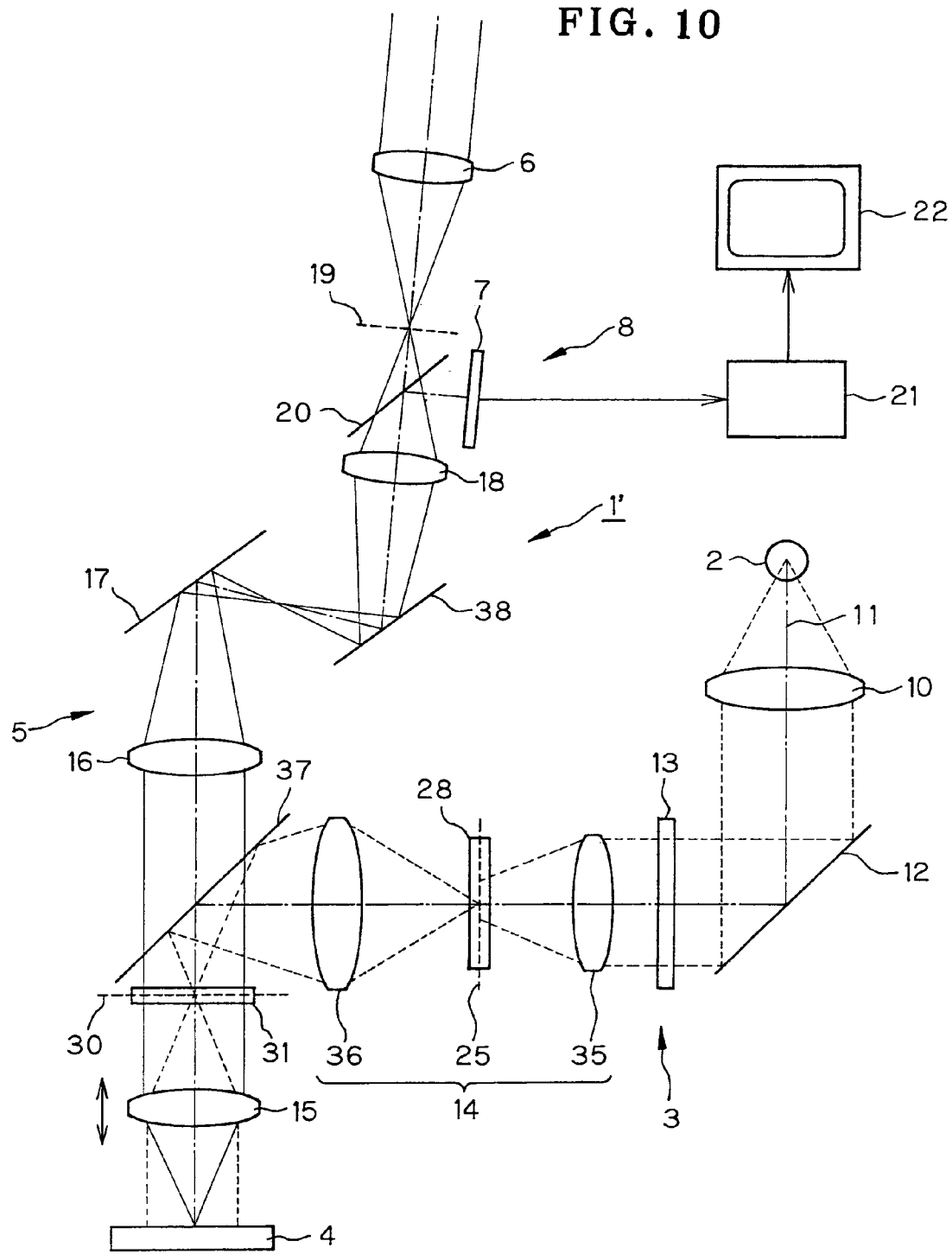
FIG. 10 is a schematic optical path diagram for the arrangement of FIG. 4 applied to a reflecting microscope.

FIG. 10 is a schematic optical path diagram for the arrangement of FIG. 4 constructed in the form of a reflecting microscope. This reflecting microscope shown generally at 1' is made up of a light source 2, an illumination optical system 3 for guidance of light emanating from light source 2, a viewing optical system 5 for forming the image of an object 4 under observation, an eyepiece lens 6 for magnifying the image of object 4 for visual observation, and a CCD camera 8 including an image pickup device 7 for picking up the image of object 4. The CCD camera 8 is further connected with a personal computer 21 for storage and operation of picked-up images and a TV monitor 22.

The illumination optical system 3 is built up of, in order from the side of light source 2, a collector lens 10, a deflecting mirror 12 for deflection of an optical axis 11 of illumination light, an interference filter 13 for turning light from the light source 2 into quasi-monochromatic light, and a condenser lens 14.

The viewing optical system 5 is constructed of, in order from the side of object 4 under observation, an objective lens 15 for forming the image of object 4, a half-silvered mirror 37 for introduction of illumination light from the illumination optical system 3, a first relay lens 16, a deflecting mirror 17 for deflection of light from the objective lens 15, a second deflecting mirror 38, and a second relay lens 18 for cooperating with the first relay lens 17 to form the image of the objective lens 15 (the image of object 4) on an image-formation plane.

Between the second relay lens 18 and the image-formation plane 19 there is interposed a switchover mirror 20 that is a half-silvered mirror for visually observing the image of object 4 by the eyepiece lens 6 and the CCD camera 8 or switching the visual observation of the image of object 4 by the eyepiece lens 6 over to that by the CCD camera 8 and vice versa.

At the pupil position 25 of the condenser lens 14 onto which light from the light source 2 is projected, there is detachably located an aperture unit 28 similar to that in the example of FIG. 4.

Further on the pupil plane 30 of the objective lens 15, there is detachably located an absorption film unit 31 similar to that in the example of FIG. 4.

In this example, the illumination light from the light source 2 is projected onto the pupil position of the condenser lens 14. Then, that illumination light is reflected at the half-silvered mirror 37 upon passing through the condenser lens 14, falling on the object 4 under observation through the objective lens 15 for Koëhler illumination of the object 4. Upon the illumination of the object 4, the light is reflected at the object 4 into the objective lens 15. Upon incidence on the objective lens 15, the light passes through the half-silvered mirror 37 to form an image of the object 4 on an image-formation plane 19 by means of the objective lens 15, the first relay lens 16 and the second relay lens 18.

The image of the object 4 under observation formed on the image-formation plane 19 is incident on the eyepiece lens 6, and forms an image on the image pickup plane of the image pickup device 7 in the CCD camera 8 by means of the switchover mirror 20. Thus, the object 4 under observation can be observed by the reflecting microscope at the focus position as usual.

On the other hand, when the aperture unit 28 is located at the pupil position of the condenser lens 14, illumination light from the light source 2 passes successively through the collector lens 10, the interference filter 13 and a front lens 35 forming a part of the condenser lens 14, illuminating the circular aperture 26 or the zonal aperture 27 in the aperture unit 28. Passing through the circular aperture 26 or the zonal aperture 27, the light passes through a rear lens 36 forming another part of the condenser lens 14 and the half-silvered mirror 37, forming an image 26' or 27' of the aperture on the pupil plane 30 of the objective lens 15. Thereafter, the light passes through the objective lens 15, falling on the object 4 under observation in the form of collimated light. The light reflected at and the light diffracted through the object 4 reenter the objective lens 15, at which they are reflected, again forming the image 26' or 27' of the aperture 26 or 27 on the pupil plane 30 of the objective lens 15.

Therefore in this example, too, defocusing is carried out by adjusting a collimator mechanism (focus adjuster mechanism) suffixed to the microscope to effect a minute amount of back or fore displacement of the optical axis position of the objective lens 15 from a position that is regarded as a focus position for ordinary observations with respect to the object 4 under observation. With the application of defocusing, the illumination light passing through the circular aperture 26 or the zonal aperture 27 in the aperture unit 28 behaves such that the light diffracted through and the light transmitted at the object 4 pass through different portions in the pupil 30' of the objective lens 15 (see FIG. 3). Between the reflected light beam and the diffracted light beam there is a phase difference that corresponds to the angle of diffraction and the amount of a wavefront change based on defocusing. That phase difference forms on the image-formation plane 19 an image intensity distribution proportional to the amount of pits and projections of the object 4 under observation.

In this reflecting microscope, too, the absorption film unit 31 could be located on the pupil plane 30 of the objective lens 15, as is the case with the example of FIG. 4, to allow a part of the zero-order transmitted light through the object 4 under observation so that the contrast of the image regarding the amount of pits and projections to be visualized can be improved.

In the instant reflecting microscope, too, it is desired to satisfy condition (10) and condition (11).

It is here noted that as the absorption film unit 31 is located on the pupil plane 30 between the objective lens 15 and the half-silvered mirror 37, the whole luminance of the illumination light after passing through the aperture 26 or the aperture 27 becomes weak upon falling on the object 4 under observation. To avoid this, it may be preferable to locate the absorption film unit 31 at a position conjugate to the pupil plane 30 between the half-silvered mirror 37 and the image-formation plane 19.

In the instant reflecting microscope, too, it is acceptable to visualize the phase distribution by deforming the variable-shape mirror 17', not the deflecting mirror 17 of FIG. 10, located at a position conjugate to the pupil plane 30 of the objective lens 15 as in the example of FIG. 8 instead of effecting defocusing with the collimator mechanism of the microscope.

As is the case with the example of FIG. 9, it is acceptable to use the LED 2' in place of the light source 2, thereby dispensing with the aperture unit 28 located at the pupil position 25 of the condenser lens 14.

With the examples other than that of FIG. 4, too, the contrast of the image intensity distribution is invertible by inverting the wave aberration introduced onto the pupil plane 30 of the objective lens 15 or a position conjugate thereto. Accordingly, if, as is the case with the example of FIG. 4, the image before its contrast is inverted and the image with its contrast inverted are picked up by the CCD camera 8 and captured in the personal computer 21 to perform a subtract operation for each pixel of the two images, it is then possible to double the image contrast of the image component corresponding to the phase or pit-and-projection distribution of the object 4 under observation. It is also possible to obtain only the image intensity distribution corresponding to the phase or pit-and-projection distribution of the object 4 under observation, because the halo component of the image component having no phase information on dust, foreign matters, illumination variations, etc. that are not affected by wavefront changes is canceled out down to zero.

As can be understood from the foregoing, the microscopy of the invention, and the microscope used to implement it enables living cells or minute pits and projections on metal surfaces, etc. to be observed without recourse to phase contrast microscopes or differential interference microscopes. In particular, it is possible to observe phase distributions or pit-and-projection distributions at a relatively low magnification such as an image-formation magnification of up to 4, at which conventional phase contrast microscopes or differential interference microscopes encounter difficulty. It is also possible to cancel out illumination variations or halo components, thereby obtaining an image intensity distribution of good contrast corresponding to the phase or pit-and-projection distribution of an object under observation.

The invention is now explained specifically with reference to the method and apparatus for determining or measuring the state of growing cells using the principles of visualizing the phase object according to the invention.

The basics of the method and apparatus for determining or measuring the state of growing cells according to the invention are that when the image to be observed of growing cells that are generally a phase object is converted by interference into a contrast image, the sign of a phase difference between interfering light beams is inverted to obtain two images with inverted contrasts to enhance the contrast of a contrast image of the growing cells, so that the number, morphology, distribution or the like of the growing cells can be reliably determined or measured. Methods for converting phase objects by interference into contrast images include, in addition to such defocusing, and wave aberration-introducing methods as described above, phase difference methods and differential inference methods (non-patent publication 1).

Specific examples of the microscopic measurement apparatus of the invention are now explained with the microscope capable of observing and picking up the contrast image of growing cells inclusive of contrast inversion, utilizing such a defocusing method as described above.

Figure 11:
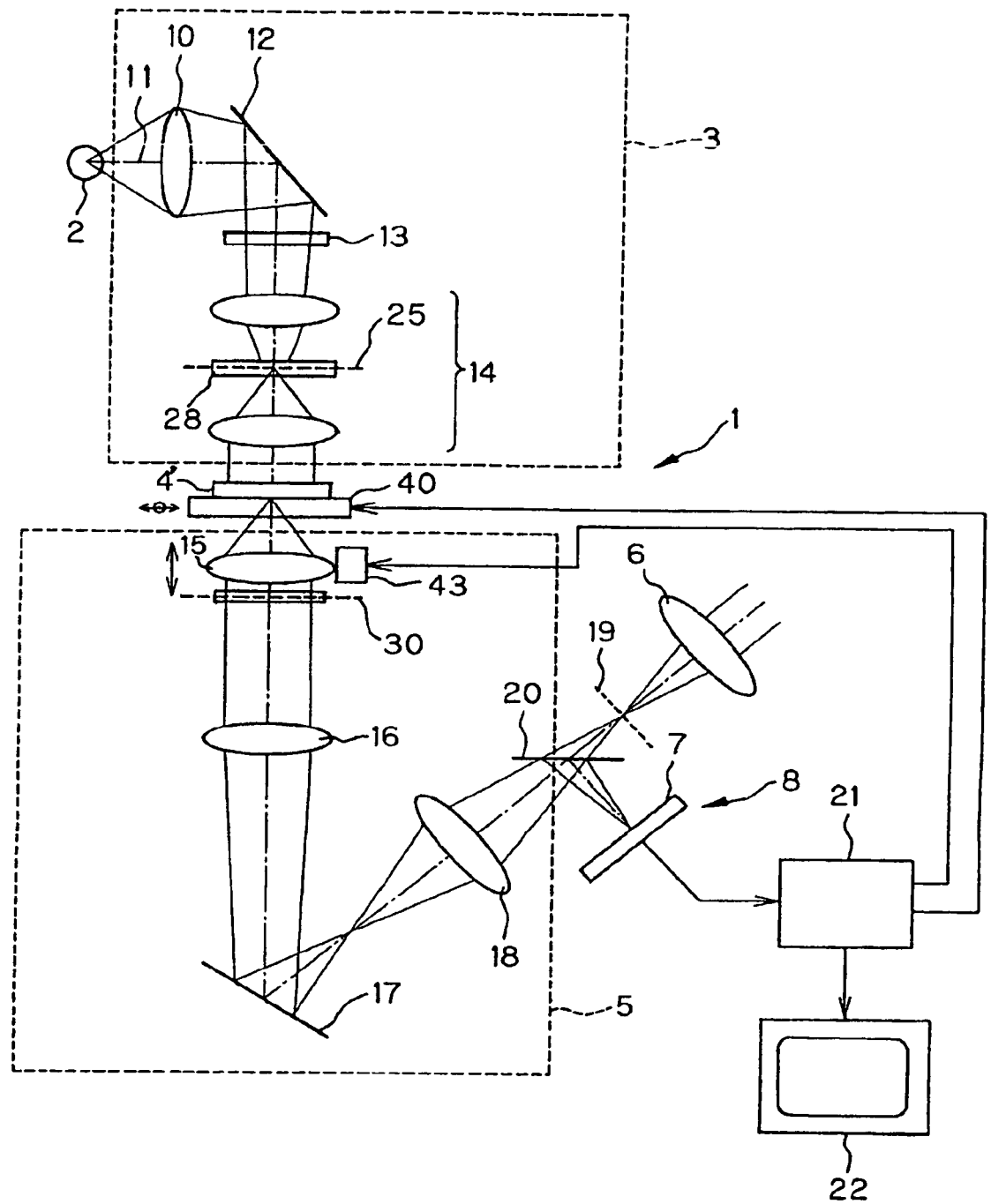
FIG. 11 is generally illustrative in schematic of one example of the microscope capable of viewing and picking up the contrast image of growing cells, making use of defocusing.

FIG. 11 is generally illustrative in schematic of the microscope 1 capable of observing and picking up the contrast images of growing cells utilizing such defocusing. The microscope of the instant example is constructed in the form of an inverted microscope 1 that is made up of a light source 2, an illumination optical system 3 for guidance of light emanating from light source 2, a viewing optical system 5 for forming a contrast image of growing cells at an internal bottom position of a laboratory dish 4' on an X-Y stage 40, an eyepiece lens 6 for magnifying the contrast image of growing cells at the internal bottom position of the laboratory dish 4' for visual observation, and a CCD camera 8 including an image pickup device 7 for picking up the image of growing cells at the internal bottom position of the laboratory dish 4'. The CCD camera 8 is further connected with a personal computer 21 for storage and operation of picked-up images and a TV monitor 22, with focus signals from the personal computer 21 sent out to an objective lens displacement mechanism 43 via a driver circuit.

The illumination optical system 3 is built up of, in order from the side of the light source 2, a collector lens 10, a deflecting mirror 12 for deflection of the optical axis 11 of illumination light, an interference filter 13 for turning light from the light source 2 into quasi-monochromatic light, and a condenser lens 14.

The viewing optical system 5 is constructed of, in order from the side of the laboratory dish 4' with growing cells placed thereon, an objective lens 15 for forming the image of growing cells at the internal bottom position of the laboratory dish 4', a first relay lens 16, a deflecting mirror 17 for deflection of light from the objective lens 15, and a second relay lens 18 for cooperating with the first relay lens 17 to form the image by the objective lens 15 (the image of object 4) on an image-formation plane.

Between the second relay lens 18 and the image-formation plane 19 there is interposed a switchover mirror 20 that is a half-silvered mirror for visually observing the contrast image of growing cells by the eyepiece lens 6 and the CCD camera 8 or switching the visual observation of the image of object 4 by the eyepiece lens 6 over to that by the CCD camera 8 and vice versa.

At the pupil position 25 of the condenser lens 14 onto which light from the light source 2 is projected, there is detachably located an aperture unit 28 that includes a partial aperture comprising a circular aperture or a zonal aperture. The aperture unit 28 is formed of a shading plate except the partial aperture.

With the instant example set up as described above, illumination light from the light source 2 is projected onto the pupil position of the condenser lens 14. Then, this illumination light cooperates with the condenser lens 14 to illuminate the growing cells at the internal bottom position of the laboratory dish 4' in the form of Kehler illumination. Upon illumination of the growing cells, the light passes through the growing cells, entering the objective lens 15 so that the objective lens 15 cooperates with the first relay lens 16 and the second relay lens 18 to form an image of the growing cells on the image-formation plane 19. The contrast image of the growing cells formed on the image-formation plane 19 enters the eyepiece lens 6, forming an image on the image pickup plane of the image pickup device 7 in the CCD camera 8 by way of the switchover mirror 20. Thus, the growing cells can be observed at the focus position as usual.

In this example, defocusing is carried out by using a focus signal from the personal computer 21 to effect a minute amount of back or fore displacement of the optical axis position of the objective lens 15 from a position that is regarded as a focus position for ordinary observations via an objective lens displacement mechanism 43. With the application of defocusing, the illumination light passing through the partial aperture in the aperture unit 28 behaves such that the light diffracted and the light transmitted through the growing cells pass through different portions in the pupil 30' of the objective lens 15 (see FIG. 3). Between the transmitted light beam and the diffracted light beam there is a phase difference that corresponds to the angle of diffraction and the amount of a wavefront change based on defocusing. That phase difference acts as is the case with a phase film in a phase contrast microscope, forming on the image-formation plane 19 an image intensity distribution proportional to the phase distribution of the growing cells under observation.

The amount of the back or fore displacement of the objective lens 15 has to be such that the formed image is free of blurring. To put it another way, that amount should preferably be smaller than the value obtained by dividing the wavelength of the light source 2 used for observations by the square of the NA of the objective lens 15 used.

As already described, the phase difference of each light ray caused by defocusing is of opposite sign between displacements of the object under observation from the focus position of the objective lens 15 toward a near point side and a far point side. In the images of growing cells under observation, captured by the image pickup device 7 in the personal computer 21 at positions displaced from the focus position of the objective lens 15 toward the near point side and the far point side, their image contrasts are inverted in correspondence to the phase difference of the object under observation, as shown in FIGS. 12(a) and 12(b). Specifically, FIG. 12(a) shows on the left side a contrast image of growing cells obtained by defocusing the objective lens 15 toward the far point side, and on the right side a schematic gradation indicative of the image intensity at a scanning line position indicated by a broken line on the left side of FIG. 12(a). Likewise, FIG. 12(b) shows on the left side a contrast image of growing cells obtained by defocusing the objective lens 15 toward the near point side, and on the right side a schematic gradation indicative of the image intensity at a scanning line position indicated by a broken line on the left side of FIG. 12(b). It is here noted that defocusing is carried out in much the same amount. A background area free of any cells shows a substantially constant gradation n. Upon defocusing toward the near point side (far point side) as shown in FIG. 12(a), cells and cell nuclei have some bright contrast against the background. Conversely, upon defocusing toward the far point side (near point side) as shown in FIG. 12(b), cells and cell nuclei have some dark contrast against the background.

Thus, the sign of the phase difference goes into reverse whenever the direction of defocusing changes. With a subtract operation performed in the personal computer 21 thereby taking a difference between the values of associated individual pixels of the two contrast images (FIGS. 12(a) and 12(b)) taken of the growing cells with inverted contrasts and creating a new pixel, there is obtained such an image as shown on the left side of FIG. 12(c), wherein the intensity change of illumination light within the viewing range or the light intensity change due to foreign matters or the like is canceled out down to zero. In the case of a phase distribution such as one of growing cells, on the other hand, the contrast of an image is inverted by the inversion of the sign of a phase difference. Therefore, if a subtrac operation is applied to an image comprising two contrast images of opposite phase-difference sign, then the contrast of the image doubles as shown on the right side of FIG. 12(c) (on condition that the amount of defocusing on the near point side must be the same as that on the far point side).

Thus, the gradation (intensity value) of a cell-free portion of the image obtained by the subtract operation becomes zero. Accordingly, it is preferable that a portion having a gradation of zero or nearly zero is extracted in the personal computer 21 from the image to which the subtract operation is applied (the left side of FIG. 12(c)) as the cell-free portion, and that cell-free portion is eliminated in the personal computer 21 from the viewing range to take the rest as a cell-containing portion. In other words, a portion of the image subjected to the subtract operation and having an intensity of substantially zero is indicative of a portion having a phase of substantially zero and containing no cell. On the other hand, although another portion of the image which is subjected to the subtract operation and whose intensity is not substantially zero is indicative of a portion corresponding to the phase difference, yet it entails intensity variations of illumination light and intensity variations due to the influences of dewdrops deposited on the lid of a culture vessel, etc., failing to precisely reflect the phase difference. Therefore, extracting and excluding the cell-free portion out of the viewing range to determine the cell-containing area is preferable to direct extraction of the cell-containing portion, because influences of external perturbations are held back.

As shown by a one-dotted line on the right side of FIG. 12(c), a threshold value for binarization may be given to a portion at or near the intensity of zero of the image to which the subtract operation is applied (the left side of FIG. 12(c)) to allocate the intensity of zero to pixels in an area below the threshold value and the intensity of 1 to pixels greater than the threshold value, so that such a binarized image as shown in FIG. 12(d) is formable. This binarized image is then indicative of the abundance distribution of cells.

If the data about that binarized image is added up for each pixel and the sum is divided by the total number of pixels in the viewing range, the abundance density of cells in the viewing range is then calculated. If the area of one pixel on an actual object surface (the internal bottom of the laboratory dish 4') is multiplied by the sum, it is then possible to calculate the total area of cells present in the viewing range, and if that total area is divided by the average area of one cell, it is then possible to calculate the number of cells present in the viewing range.

Alternatively, if the number of pixels in which cells are present is divided by the total number of pixels in the image, it is then possible to find out the average density of cells and the rate taken up by cells in the viewing range. Also, if the average number of pixels taken up by one cell is previously determined, it is then possible to divide the number of pixels in which cells are present by the average number of pixels for one cell, thereby finding out the number of cells present in the viewing range.

Apart from binarization, not only the subtract operation but also an add operation is applied to two images captured in the personal computer 21 (the left images in FIG. 12(a) and FIG. 12(b)).

As described above, image information equivalent to the phase distribution of the object under observation (growing cells) is obtainable from the image obtained by means of the subtract operation. Remaining affected by illumination variations, etc., however, that image information still fails to provide any precise indication of the phase distribution. Therefore, if the add operation is performed in the personal computer 21 to obtain the sum of associated individual pixels of two images (FIGS. 12(a) and 12(b)) with inverted contrasts and create a new pixel, information about the intensity distribution such as illumination variations in the viewing range is then obtainable, because the phase distribution is canceled out by the inverted distribution of a portion with cells present therein. By dividing the image obtained by the subtract operation by the image obtained by that add operation, the influences of illumination variations, etc. can be so held back that image information proportional to the phase distribution is obtainable.

The same cells, cultured in the laboratory dish 4', could be thought of as having substantially identical refractive indices, and the obtained phase distribution could be equivalent to information about the height of the cells. Accordingly, the height distribution of the growing cells could be determined or measured from the intensity (gradation) distribution of the thus obtained image (the image obtained by dividing the image obtained by the subtract operation by the image obtained by the add operation).

Some growing cells vary in thickness between their nucleus portions and other portions, with the nucleus portion swelling up as shown at N on the right side of FIG. 12(c). In the above image obtained by dividing the image obtained by the subtract operation by the image obtained by the add operation, an image with cell nucleus portions extracted off is obtained by binarization image processing wherein zero is assigned to a portion less than a specific threshold value (that is larger than a value equivalent to the height of a nucleus-free portion and smaller than a value equivalent to the height of a nucleus-containing portion) and one is allocated to other portions. The area of the nucleus of each cell may be determined from the binarized image.

By multiplying the above binarized image indicative of a nucleus distribution by the image indicative of the previous phase distribution (the image obtained by dividing the image obtained by the subtract operation by the image obtained by the add operation), the height distribution of the nucleus portion can be calculated. The flatness of the nucleus may also be determined from the information about the nucleus area and height of each cell.

Further, simultaneously with the capture in the personal computer of the two images (the left image in FIG. 12(a) and the right image in FIG. 12(b)) having a phase difference of opposite sign upon interference, another aperture unit having a zonal aperture for the illumination of a dark field, instead of the aperture unit 28 having a partial aperture for defocusing, is inserted in the pupil position 25 of the condenser lens 14 to take in a dark field image of the same growing cells using dark field illumination. If that dark field image is multiplied by the above binarized image indicative of a nucleus distribution, it is then possible to obtain a dark field image of the nucleus portion and, hence, calculate the scattering distribution of the nucleus.

In the foregoing explanation of the invention, defocusing is used as the means for obtaining two contrast images that are the images to be observed of the growing cells that are generally a phase object and have a phase difference of opposite sign upon interference for image formation; however, it is acceptable to make use of wave aberration introduction. Referring again to FIG. 11, the aperture unit 28 having a partial aperture is located at the pupil position 25 of the condenser lens 14, and in the pupil plane 30 of the objective lens 15 there is introduced a wavefront that varies in size with the diameter of the pupil. To this end; for instance, the surface of the deflecting mirror 17 at a position conjugate to the pupil plane 30 of the objective lens 15 is deformed. If, in this case, that deformation is carried out in the same shape but with opposite sign, then two contrast images with a phase difference of opposite sign are then obtainable, as described above.

Alternatively, it is acceptable to rely on the principles of the differential interference microscope. This is explained with reference to FIG. 11. Instead of the aperture unit 28, a diffusion screen-providing first prism is inserted between orthogonal polarized light components by a Nomarski or Wollaston prism at the pupil position 25 of the condenser lens 14, and the second prism comprising a Nomarski or Woolaston prism to return that diffusion screen back is positioned at the pupil plane 30 of the objective lens 15 conjugate to the first prism, a polarizer is located on the entrance side of the first prism, and an analyzer is located at the exit side of the second prism. By taking two images while the amount of retardation between the two polarized light components is inverted, it is possible to obtain two contrast images having a phase difference of opposite sign, as described above.

While the method for implement microscopy and microscopic measurements according to the invention, the microscope for implementing them, and the apparatus for implementing microscopic measurements according to the invention have been described with reference to the principles and examples of the invention, it is understood that the invention is in no sense limited thereto, and could be modified in various forms and ways.

The method for implement microscopy and microscopic measurements according to the invention, the microscope for implementing them, and the apparatus for implementing microscopic measurements according to the invention, for instance, could be embodied as follows.

(1) A method for implementing microscopy, characterized in that a partial aperture is located at the pupil position of an illumination optical system in a microscope, an object under observation is illuminated by light passing through said partial aperture, and in the pupil position of an image-formation optical system there is introduced a wavefront varying in size with the diameter of the pupil to view an image formed on an image-formation plane of said image-formation optical system.

(2) The method for implementing microscopy according to (1) above, characterized in that the image-formation magnification of said image-formation optical system is 4 or lower.

(3) The method for implementing microscopy according to (2) above, characterized in that the wavefront introduced in the pupil position of said image-formation optical system is based on a displacement from the focus position of said image-formation optical system.

(4) The method for implementing microscopy according to (3) above, characterized in that an absorption film that conforms in shape to the image of said partial aperture or said substantial point light source at the pupil position of said image-formation optical system and is slightly larger than said shape is located at the pupil of said image-formation optical system or at or near a position conjugate thereto, with satisfaction of expression (11)

$$\Delta \leq D_0/10 \qquad (11)$$

where $\Delta$ is a margin width on an inner or outer peripheral side of said absorption film with respect to the image of said partial aperture or said substantial point light source at the pupil position of said image-formation optical system, and $D_0$ is the diameter of the pupil of said image-formation optical system.

(5) The method for implementing microscopy according to (3) above, characterized in that while the wavefront introduced in the pupil position of said image-formation optical system is substantially symmetrically changed, two images with inverted contrasts are taken of the same object under observation, and a subtract operation is applied between the two images thereby providing an enhanced contrast.

(6) The method for implementing microscopy according to (3) above, characterized in that while the wavefront introduced in the pupil position of said image-formation optical system is substantially symmetrically changed, two images with inverted contrasts are taken of the same object under observation, a subtract operation is applied between the two images to form an image with the subtract operation applied thereto, and at least one of the number of cells, the area taken up by cells, the abundance distribution of cells and the abundance density of cells in a viewing range is measured from the obtained image with the subtract operation applied thereto.

(7) The method for implementing microscopy according to (3) above, characterized in that while the wavefront introduced in the pupil position of said image-formation optical system is substantially symmetrically changed, two images with inverted contrasts are taken of the same object under observation, and a subtract operation and an add operation are applied between the two images to form two images wherein the image subjected to the subtract operation is divided by the image subjected to the add operation to measure information about the thickness of cells in a viewing range.

(8) The method for implementing microscopy according to (2) above, characterized in that said partial aperture comprises a circular aperture or a zonal aperture, with satisfaction of condition (10):

$$D_0/10 \leq D_1 \leq D_0/3 \qquad (10)$$

where $D_1$ is the aperture width of the image at the pupil position of said image-formation optical system, and $D_0$ is the diameter of the pupil of said image-formation optical system.

(9) The method for implementing microscopy according to (8) above, characterized in that an absorption film that conforms in shape to the image of said partial aperture or said substantial point light source at the pupil position of said image-formation optical system and is slightly larger than said shape is located at the pupil of said image-formation optical system or at or near a position conjugate thereto, with satisfaction of condition (11)

$$\Delta \leq D_0/10 \qquad (11)$$

where $\Delta$ is a margin width on the inner or outer peripheral side of said absorption film with respect to the image of said partial aperture or said substantial point light source at the pupil position of said image-formation optical system, and $D_0$ is the diameter of the pupil of said image-formation optical system.

(10) The for implementing microscopy according to (2) above, characterized in that while the wavefront introduced in the pupil position of said image-formation optical system is substantially symmetrically changed, two images with inverted contrasts are taken of the same object under observation, and a subtract operation is applied between the two images thereby providing an enhanced contrast.

(11) The method for implementing microscopy according to (2) above, characterized in that while the wavefront introduced in the pupil position of said image-formation optical system is substantially symmetrically changed, two images with inverted contrasts are taken of the same object under observation, a subtract operation is applied between the two images to form an image with the subtract operation applied thereto, and at least one of the number of cells, the area taken up by cells, the abundance distribution of cells and the abundance density of cells in a viewing range is measured from the obtained image with the subtract operation applied thereto.

(12) The method for implementing microscopy according to (2) above, characterized in that while the wavefront introduced in the pupil position of said image-formation optical system is substantially symmetrically changed, two images with inverted contrasts are taken of the same object under observation, and a subtract operation and an add operation are applied between the two images to form two images wherein the image subjected to the subtract operation is divided by the image subjected to the add operation to measure information about the thickness of cells in a viewing range.

(13) The method for implementing microscopy according to (1) above, characterized in that the wavefront introduced in the pupil position of said image-formation optical system is based on a displacement from the focus position of said image-formation optical system.

(14) The method for implementing microscopy according to (13) above, characterized in that said partial aperture comprises a circular aperture or a zonal aperture, with satisfaction of condition (10):

$$D_0/10 \leq D_1 \leq D_0/3 \tag{10}$$

where $D_1$ is the aperture width of the image at the pupil position of said image-formation optical system, and $D_0$ is the diameter of the pupil of said image-formation optical system.

(15) The method for implementing microscopy according to (13) above, characterized in that an absorption film that conforms in shape to the image of said partial aperture or said substantial point light source at the pupil position of said image-formation optical system and is slightly larger than said shape is located at the pupil of said image-formation optical system or at or near a position conjugate thereto, with satisfaction of condition (11)

$$\Delta \leq D_0/10 \tag{11}$$

where $\Delta$ is a margin width on the inner or outer peripheral side of said absorption film with respect to the image of said partial aperture or said substantial point light source at the pupil position of said image-formation optical system, and $D_0$ is the diameter of the pupil of said image-formation optical system.

(16) The method for implement microscopy according to (13) above, characterized in that while the wavefront introduced in the pupil position of said image-formation optical system is substantially symmetrically changed, two images with inverted contrasts are taken of the same object under observation, and a subtract operation is applied between the two images thereby providing an enhanced contrast.

(17) The method for implementing microscopy according to (13) above, characterized in that while the wavefront introduced in the pupil position of said image-formation optical system is substantially symmetrically changed, two images with inverted contrasts are taken of the same object under observation, a subtract operation is applied between the two images to form an image with the subtract operation applied thereto, and at least one of the number of cells, the area taken up by cells, the abundance distribution of cells and the abundance density of cells in a viewing range is measured from the obtained image with the subtract operation applied thereto.

(18) The method for implementing microscopy according to (17) above, characterized in that a portion having an intensity value of zero or nearly zero is extracted out of the intensity distribution of the image subjected to the subtract operation to take said portion as being a cell-free portion and other portion as being a cell-containing portion, thereby making a separation between the portions containing cells and no cells.

(19) The method for implementing microscopy according to (18) above, characterized in that a portion having an intensity value of zero or nearly zero is extracted out of the intensity distribution of the image subjected to the subtract operation to allocate the intensity value to one value and other portion to another one intensity value for binarization.

(20) The method for implementing microscopy according to (13) above, characterized in that while the wavefront introduced in the pupil position of said image-formation optical system is substantially symmetrically changed, two images with inverted contrasts are taken of the same object under observation, and a subtract operation and an add operation are applied between the two images to form two images wherein the image subjected to the subtract operation is divided by the image subjected to the add operation to measure information about the thickness of cells in a viewing range.

(21) The method for implementing microscopy according to (1) above, characterized in that while the wavefront introduced in the pupil position of said image-formation optical system is substantially symmetrically changed, two images with inverted contrasts are taken of the same object under observation, and a subtract operation is applied between the two images thereby providing an enhanced contrast.

(22) The method for implementing microscopy according to (1) above, characterized in that while the wavefront introduced in the pupil position of said image-formation optical system is substantially symmetrically changed, two images with inverted contrasts are taken of the same object under observation, a subtract operation is applied between the two images to form an image with the subtract operation applied thereto, and at least one of the number of cells, the area taken up by cells, the abundance distribution of cells and the abundance density of cells in a viewing range is measured from the obtained image with the subtract operation applied thereto.

(23) The method for implementing microscopy according to (22) above, characterized in that a portion having an intensity value of zero or nearly zero is extracted out of the intensity distribution of the image subjected to the subtract operation to take said portion as being a cell-free portion and other portion as being a cell-containing portion, thereby making a separation between the portions containing cells and no cells.

(24) The method for implementing microscopy according to (22) above, characterized in that a portion having an intensity value of zero or nearly zero is extracted out of the intensity distribution of the image subjected to the subtract operation to allocate the intensity value to one value and other portion to another one intensity value for binarization.

(25) The method for implement microscopy according to (1) above, characterized in that while the wavefront introduced in the pupil position of said image-formation optical system is substantially symmetrically changed, two images with inverted contrasts are taken of the same object under observation, and a subtract operation and an add operation are applied between the two images to form two images wherein the image subjected to the subtract operation is divided by the image subjected to the add operation to measure information about the thickness of cells in a viewing range.

(26) A method for implementing microscopy, characterized in that a substantial point light source that gives out divergent light is used as an illumination light source to form the image of said substantial point light source at the pupil position of an illumination optical system in the microscope, an object under observation is illuminated by divergent light from the image of said substantial point light source, and in the pupil position of an image-formation optical system there is introduced a wavefront varying in size with the diameter of the pupil to view an image formed on an image-formation plane of said image-formation optical system.

(27) The method for implementing microscopy according to (26) above, characterized in that the image-formation magnification of said image-formation optical system is 4 or lower.

(28) The method for implementing microscopy according to (27) above, characterized in that the wavefront introduced in the pupil position of said image-formation optical system is based on a displacement from the focus position of said image-formation optical system.

(29) The method for implementing microscopy according to (26) above, characterized in that the wavefront introduced in the pupil position of said image-formation optical system is based on a displacement from the focus position of said image-formation optical system.

(30) The method for implementing microscopy according to (27) above, characterized in that the wavefront introduced to be in the pupil position of said image-formation optical system is created by a variable-shape mirror that is located at the pupil of said image-formation optical system or at or near a position conjugate thereto and has a variable or adjustable reflecting surface shape.

(31) A method for implementing microscopy, characterized in that by means of a microscope that comprises an illumination optical system, a viewing optical system including a unit for converting an object under observation into a contrast image by interference and an image pickup device for capturing therein a contrast image having a phase difference of opposite sign upon interference of the image under observation, two images comprising contrast images having a phase difference of opposite sign are captured therein to apply a subtract operation to the thus captured two images, and at least one of the number of cells, the area taken up by cells, the abundance distribution of cells and the abundance density of cells in a viewing range is measured from the obtained image with the subtract operation applied thereto.

(32) The method for implementing microscopy according to (31) above, characterized in that a portion having an intensity value of zero or nearly zero is extracted out of the intensity distribution of the image subjected to the subtract operation to take said portion as being a cell-free portion and other portion as being a cell-containing portion, thereby making a separation between the portions containing cells and no cells.

(33) The method for implementing microscopy according to (31) above, characterized in that a portion having an intensity value of zero or nearly zero is extracted out of the intensity distribution of the image subjected to the subtract operation to allocate the intensity value to one value and other portion to another one intensity value for binarization.

(34) A method for implementing microscopy, characterized in that by means of a microscope that comprises an illumination optical system, a viewing optical system including a unit for converting an object under observation into a contrast image by interference and an image pickup device for capturing therein a contrast image having a phase difference of opposite sign upon interference of the image under observation, two images comprising contrast images having a phase difference of opposite sign captured therein to apply a subtract operation and an add operation to the thus captured two images to form two images wherein the image subjected to the subtract operation is divided by the image subjected to the add operation to measure information about the thickness of cells in a viewing range.

(35) A microscope, comprising a light source, an illumination optical system for the guidance of light from the light source to an object under observation, a partial aperture located substantially at the pupil position of the illumination optical system and an image-formation optical system for forming on an image-formation plane an image of the object under observation illuminated by light passing through the partial aperture, and further comprising an eyepiece optical system or an image pickup optical system for viewing the image formed on the image-formation plane, characterized in that:

the diameter of the image of said partial aperture at the pupil position of said image-formation optical system is set smaller than the diameter of the pupil of said image-formation optical system, wherein at the pupil position of said image-formation optical system there is located wavefront introduction means for introducing in the pupil position of said image-formation optical system a wavefront varying in size with the diameter of the pupil.

(36) The microscope according to (35) above, characterized in that the image-formation magnification of said image-formation optical system is 4 or lower.

(37) The microscope according to (36) above, characterized in that said wavefront introduction means comprises means for displacement and adjustment of said image-formation optical system in the optical axis direction.

(38) The microscopy according to (37) above, characterized in that an absorption film that conforms in shape to the image of said partial aperture or said substantial point light source at the pupil position of said image-formation optical system and is slightly larger than said shape is located at the pupil of said image-formation optical system or at or near a position conjugate thereto, with satisfaction of condition (11)

$$\Delta \leq D_0/10 \qquad (11)$$

where $\Delta$ is a margin width on an inner or outer peripheral side of said absorption film with respect to the image of said partial aperture or said substantial point light source at the pupil position of said image-formation optical system, and $D_0$ is the diameter of the pupil of said image-formation optical system.

(39) The microscope according to (37) above, characterized by further comprising an image pickup optical system for picking up the image to be formed on said image-formation plane, an image pickup device located on the image pickup plane thereof, and operation and storage means for operation and storage of an image picked up by said image pickup device.

(40) The microscope according to (37) above, characterized by further comprising a processing unit for capturing two images comprising contrast images having a phase difference of opposite sign by means of said microscope and applying a subtract operation to the thus captured two images to form an image subjected to the subtract operation, so that at least one of the number of cells, the area taken up by cells, the abundance distribution of cells and the abundance density of cells in a viewing range is measured from the obtained image with the subtract operation applied thereto.

(41) The microscope according to (37) above, characterized by further comprising an operation unit for capturing two images comprising contrast images having a phase difference of opposite sign and applying a subtract operation and an add operation to the thus captured two images, and a thickness measurement unit for dividing the image subjected to the subtract operation by the image subjected to the add operation to measure information about the thickness of cells in a viewing range.

(42) The microscope according to (36) above, characterized in that said partial aperture comprises a circular aperture or a zonal aperture, with satisfaction of condition (10):

$$D_0/10 \leq D_1 \leq D_0/3 \qquad (10)$$

where $D_1$ is the aperture width of the image at the pupil position of said image-formation optical system, and $D_0$ is the diameter of the pupil of said image-formation optical system.

(43) The microscope according to (36) above, characterized in that an absorption film that conforms in shape to the image of said partial aperture or said substantial point light source at the pupil position of said image-formation optical system and is slightly larger than said shape is located at the pupil of said image-formation optical system or at or near a position conjugate thereto, with satisfaction of condition (11)

$$\Delta \leq D_0/10 \qquad (11)$$

where $\Delta$ is a margin width on the inner or outer peripheral side of said absorption film with respect to the image of said partial aperture or said substantial point light source at the pupil position of said image-formation optical system, and $D_0$ is the diameter of the pupil of said image-formation optical system.

(44) The microscope according to (36) above, characterized by further comprising an image pickup optical system for picking up the image to be formed on said image-formation plane, an image pickup device located on the image pickup plane thereof, and operation and storage means for operation and storage of an image picked up by said image pickup device.

(45) The microscope according to (36) above, characterized by further comprising a processing unit for capturing two images comprising contrast images having a phase difference of opposite sign by means of said microscope and applying a subtract operation to the thus captured two images to form an image subjected to the subtract operation, so that at least one of the number of cells, the area taken up by cells, the abundance distribution of cells and the abundance density of cells in a viewing range is measured from the obtained image with the subtract operation applied thereto.

(46) The microscope according to (36) above, characterized by further comprising an operation unit for capturing two images comprising contrast images having a phase difference of opposite sign by means of said microscope and applying a subtract operation and an add operation to the thus captured two images, and a thickness measurement unit for dividing the image subjected to the subtract operation by the image subjected to the add operation to measure information about the thickness of cells in a viewing range.

(47) The microscope according to (35) above, characterized in that said wavefront introduction means comprises means for displacement and adjustment of said image-formation optical system in the optical axis direction.

(48) The microscope according to (47) above, characterized in that said partial aperture comprises a circular aperture or a zonal aperture, with satisfaction of condition (10):

$$D_0/10 \leq D_1 \leq D_0/3 \qquad (10)$$

where $D_1$ is the aperture width of the image at the pupil position of said image-formation optical system, and $D_0$ is the diameter of the pupil of said image-formation optical system.

(49) The microscope according to (36) above, characterized in that an absorption film that conforms in shape to the image of said partial aperture or said substantial point light source at the pupil position of said image-formation optical system and is slightly larger than said shape is located at the pupil of said image-formation optical system or at or near a position conjugate thereto, with satisfaction of condition (11)

$$\Delta \leq D_0/10 \qquad (11)$$

where $\Delta$ is a margin width on the inner or outer peripheral side of said absorption film with respect to the image of said partial aperture or said substantial point light source at the pupil position of said image-formation optical system, and $D_0$ is the diameter of the pupil of said image-formation optical system.

(50) The microscope according to (47) above, characterized by further comprising an image pickup optical system for picking up the image to be formed on said image-formation plane, an image pickup device located on the image pickup plane thereof, and operation and storage means for operation and storage of an image picked up by said image pickup device.

(51) The microscope according to (47) above, characterized by further comprising a processing unit for capturing two images comprising contrast images having a phase difference of opposite sign by means of said microscope and applying a subtract operation to the thus captured two images to form an image subjected to the subtract operation, so that at least one of the number of cells, the area taken up by cells, the abundance distribution of cells and the abundance density of cells in a viewing range is measured from the obtained image with the subtract operation applied thereto.

(52) The microscope according to (51) above, characterized by further comprising a separation unit for extracting a portion having an intensity value of zero or nearly zero out of the intensity distribution of the image subjected to the subtract operation to define said portion as being a cell-free portion and other portion as being a cell-containing portion, thereby making a separation between the portions containing cells and no cells.

(53) The microscope according to (51) above, characterized by further comprising a binarization unit for extracting a portion having an intensity of zero or nearly zero out of the intensity distribution of the image subjected to the subtract operation to allocate the intensity value to one value and other portion to another one intensity value for binarization.

(54) The microscope according to (47) above, characterized by further comprising an operation unit for capturing two images comprising contrast images having a phase difference of opposite sign by means of said microscope and applying a subtract operation and an add operation to the thus captured two images, and a thickness measurement unit for dividing the image subjected to the subtract operation by the image subjected to the add operation to measure information about the thickness of cells in the viewing range.

(55) The microscope according to (35) above, characterized by further comprising an image pickup optical system for picking up the image to be formed on said image-formation plane, an image pickup device located on the image pickup plane thereof, and operation and storage means for operation and storage of an image picked up by said image pickup device.

(56) The microscope according to (35) above, characterized by further comprising a processing unit for capturing two images comprising contrast images having a phase difference of opposite sign by means of said microscope and applying a subtract operation to the thus captured two images to form an image subjected to the subtract operation, so that at least one of the number of cells, the area taken up by cells, the abundance distribution of cells and the abundance density of cells in a viewing range is measured from the obtained image with the subtract operation applied thereto.

(57) The microscope according to (56) above, characterized by further comprising a separation unit for extracting a portion having an intensity value of zero or nearly zero out of the intensity distribution of the image subjected to the subtract operation to define said portion as being a cell-free portion and other portion as being a cell-containing portion, thereby making a separation between the portions containing cells and no cells.

(58) The microscope according to (56) above, characterized by further comprising a binarization unit for extracting a portion having an intensity of zero or nearly zero out of the intensity distribution of the image subjected to the subtract operation to allocate the intensity value to one value and other portion to another one intensity value for binarization.

(59) The microscope according to (35) above, characterized by further comprising an operation unit for capturing two images comprising contrast images having a phase difference of opposite sign by means of said microscope and applying a subtract operation and an add operation to the thus captured two images, and a thickness measurement unit for dividing the image subjected to the subtract operation by the image subjected to the add operation to measure information about the thickness of cells in the viewing range.

(60) A microscope, comprising a substantial point light source for giving out divergent light, an illumination light source for guiding light from the substantial light source to an object under observation while the image of the substantial point light source is once formed at a pupil position, and an image-formation optical system for forming on an image-formation plane the image of the object under observation illuminated by light from the substantial point light source, and further comprising an eyepiece optical system or an image pickup optical system for viewing the image formed on the image-formation plane, characterized in that:

the diameter of the image of said substantial point light source at the pupil position of said image-formation optical system is set smaller than the diameter of the pupil of said image-formation optical system, wherein at the pupil position of said image-formation optical system there is located wavefront introduction means for introducing in the pupil position of said image-formation optical system a wavefront varying in size with the diameter of the pupil.

(61) The microscope according to (60) above, characterized in that the image-formation magnification of said image-formation optical system is 4 or lower.

(62) The microscope according to (61) above, characterized in that said wavefront introduction means comprises means for displacement and adjustment of said image-formation optical system in the optical axis direction.

(63) The microscope according to (60) above, characterized in that said wavefront introduction means comprises means for displacement and adjustment of said image-formation optical system in the optical axis direction.

(64) The microscope according to (60) above, characterized in that said wavefront introduction means comprises a variable-shape mirror that is located at the pupil of said image-formation optical system or at or near a position conjugate thereto and has a variable or adjustable reflecting surface shape.

(65) An apparatus for implementing microscopic measurements, characterized by comprising a microscope that comprises an illumination optical system, a viewing optical system including a unit for converting an object under observation into a contrast image by interference and an image pickup device for capturing therein a contrast image having a phase difference of opposite sign upon interference of the image under observation, and a processing unit for capturing therein two images comprising contrast images having a phase difference of opposite sign to apply a subtract operation to the thus captured two images to form an image subjected to the subtract operation, so that at least one of the number of cells, the area taken up by cells, the abundance distribution of cells and the abundance density of cells in a viewing range is measured from the obtained image with the subtract operation applied thereto.

(66) The apparatus for implementing microscopic measurements according to (65) above, characterized by further comprising a separation unit for extracting a portion having an intensity value of zero or nearly zero out of the intensity distribution of the image subjected to the subtract operation to define said portion as being a cell-free portion and other portion as being a cell-containing portion, thereby making a separation between the portions containing cells and no cells.

(67) The apparatus for implementing microscopic measurements according to (65) above, characterized by further comprising a binarization unit for extracting a portion having an intensity of zero or nearly zero out of the intensity distribution of the image subjected to the subtract operation to allocate the intensity value to one value and other portion to another one intensity value for binarization.

(68) An apparatus for implementing microscopic measurements, characterized by comprising a microscope that comprises an illumination optical system, a viewing optical system including a unit for converting an object under observation into a contrast image by interference, and an image pickup device for capturing therein a contrast image having a phase difference of opposite sign upon interference of the image under observation, an operation unit for capturing in said microscope two images comprising contrast images having a phase difference of opposite sign to apply a subtract operation and an add operation to the thus captured two images to form two images, and a thickness measurement unit for dividing the image subjected to the subtract operation divided by the image subjected to the add operation to measure information about the thickness of cells in the viewing range.

What we claim is:

1. A method for implementing microscopy, comprising:
providing a partial aperture at a pupil position of an illumination optical system in a microscope;
providing an absorption film at a pupil position of an objective included in an image-formation optical system:
illuminating an object under observation by passing light through said partial aperture; and
introducing a substantially spherical wavefront at a pupil position of the image-formation optical system or at near a position conjugate thereto;
wherein said object under observation is visualized on the basis of said introduced substantially spherical wavefront; and
wherein the wavefront to be introduced is based on a displacement of a focal position of said objective.

2. The method for implementing microscopy according to claim 1, characterized in that said image-formation optical system has an image-formation magnification of 4 or lower.

3. The method for implementing microscopy according to claim 1, characterized in that said partial aperture comprises a circular aperture or a zonal aperture, with satisfaction of condition (10):

$$D_0/10 \leq D_1 \leq D_0/3 \qquad (10)$$

where $D_1$ is an aperture width of an image at the pupil position of said image-formation optical system, and $D_0$ is a diameter of the pupil of said image-formation optical system.

4. The method for implementing microscopy according to claim 1, characterized in that the absorption film conforms in shape to the image of said partial aperture or a substantial point light source at the pupil position of said image-formation optical system and is slightly larger than said shape is located at the pupil of said image-formation optical system or at or near a position conjugate thereto, with satisfaction of condition (11)

$$\Delta \leq D_0/10 \qquad (11)$$

where $\Delta$ is a margin width on an inner or outer peripheral side of said absorption film with respect to the image of said partial aperture or said substantial point light source at the pupil position of said image-formation optical system, and $D_0$ is a diameter of the pupil of said image-formation optical system.

5. The method for implementing microscopy according to claim 1, characterized in that while the wavefront introduced in the pupil position of said image-formation optical system is substantially symmetrically changed, two images are taken of the same object under observation, and a subtract operation is applied between the two images to form a subtraction image.

6. The method for implementing microscopy according to claim 1, characterized in that the object under observation comprises cells, and further characterized in that while the wavefront introduced in the pupil position of said image-formation optical system is substantially symmetrically changed, two images with inverted contrasts are taken of the same object under observation, a subtract operation is applied between the two images to form an image with the subtract operation applied thereto, and at least one of the number of cells, the area taken up by cells, the abundance distribution of cells and the abundance density of cells in a viewing range is measured from the obtained image with the subtract operation applied thereto.

7. The method for implementing microscopy according to claim 6, characterized in that a portion having an intensity value of zero or nearly zero is extracted out of an intensity distribution of the image subjected to the subtract operation to take said portion as being a cell-free portion and other portion as being a cell-containing portion, thereby making a separation between the portions containing cells and no cells.

8. The method for implementing microscopy according to claim 6, characterized in that a portion having an intensity value of zero or nearly zero is extracted out of an intensity distribution of the image subjected to the subtract operation to assign an intensity value to one value and assign the other portion to another one intensity value for binarization.

9. The method for implementing microscopy according to claim 1, characterized in that the object under observation comprises cells having a thickness, and further characterized in that while the wavefront introduced in the pupil position of said image-formation optical system is substantially symmetrically changed, two images with inverted contrasts are taken of the same object under observation, and a subtract operation and an add operation are applied between the two images to form two images wherein the image subjected to the subtract operation is divided by the image subjected to the add operation to measure information about the thickness of cells in a viewing range.

10. A microscope comprising a light source, an illumination optical system for guiding light from the light source to an object under observation, an image-formation optical system for forming an image-formation plane of an image of the object under observation illuminated by light passing through a partial aperture disposed substantially at a pupil position of the illumination optical system, an eyepiece optical system or an image pickup optical system for viewing the image formed on the image-formation plane, and a wavefront introduction means for introducing a substantially spherical wavefront at a pupil position of the image-formation optical system or at or near a position conjugate thereto, characterized in that:

a diameter of said partial aperture at a pupil position of said image-formation optical system is set smaller than a pupil diameter of said image-formation optical system; and said wavefront introduction means comprises means for displacement and adjustment of the focus position of an objective of said image-formation optical system in an optical axis direction.

11. The microscope according to claim 10, characterized in that said image-formation optical system has an image-formation magnification of 4 or lower.

12. The microscope according to claim 10, characterized in that said partial aperture comprises a circular aperture or a zonal aperture, with satisfaction of condition (10):

$$D_0/10 \leq D_0/3 \qquad (10)$$

where $D_1$ is an aperture width of an image at the pupil position of said image-formation optical system, and $D_0$ is a diameter of the pupil of said image-formation optical system.

13. The microscope according to claim 12, characterized in that an absorption film that conforms in shape to the image of said partial aperture or a substantial point light source at the pupil position of said image-formation optical system and is slightly larger than said shape is located at the pupil of said image-formation optical system or at or near a position conjugate thereto, with satisfaction of condition (11)

$$\Delta \leq D_0/10 \qquad (11)$$

where $\Delta$ is a margin width on an inner or outer peripheral side of said absorption film with respect to the image of said partial aperture or said substantial point light source at the pupil position of said image-formation optical system, and $D_0$ is the diameter of the pupil of said image-formation optical system.

14. The microscope according to claim 10, characterized in that the object under observation comprises cells, and further characterized by further comprising a processing unit for capturing two images comprising contrast images having a phase difference of opposite sign by means of said microscope and applying a subtract operation to the captured two images to form an image subjected to the subtract operation, so that at least one of the number of cells, the area taken up by cells, the abundance distribution of cells and the abundance density of cells in a viewing range is measured from the obtained image with the subtract operation applied thereto.

15. The microscope according to claim 14, characterized by further comprising a separation unit for extracting a portion having an intensity value of zero or nearly zero out of an intensity distribution of the image subjected to the subtract operation to take said portion as being a cell-free portion and other portion as being a cell-containing portion, thereby making a separation between the portions containing cells and no cells.

16. The microscope according to claim 14, characterized by further comprising a binarization unit for extracting a portion having an intensity of zero or nearly zero out of an intensity distribution of the image subjected to the subtract operation to assign an intensity value to one value and assign the other portion to another one intensity value for binarization.

17. The microscope according to claim 10, characterized in that the object under observation comprises cells having a thickness, and further characterized by further comprising an operation unit for capturing two images comprising contrast images having a phase difference of opposite sign and applying a subtract operation and an add operation to the captured two images, and a thickness measurement unit for dividing the image subjected to the subtract operation by the image subjected to the add operation to measure information about the thickness of cells in a viewing range.

18. A method for implementing microscopy, comprising:
introducing a substantially spherical wavefront in a pupil plane of a microscope image-formation optical system, so that an object under observation is visualized on the basis of said introduced substantially spherical wavefront;
wherein the substantially spherical wavefront is introduced by a displacement of a focal position of an objective.

19. The method for implementing microscopy according to claim 18, wherein while the wavefront introduced in the pupil plane of said image-formation optical system is substantially symmetrically changed with respect to the pupil plane, two images are taken of the same object under observation, and a subtraction operation is applied between the two images to form a subtraction image.

20. A microscope comprising a light source, an illumination optical system for guiding light from the light source to an object under observation, an image-formation optical system for forming an image-formation plane of an image of the object under observation illuminated by said illumination optical system, an eyepiece optical system or an image pickup optical system for viewing the image formed on the image-formation plane, and a substantially spherical wavefront introduction means for introducing a substantially spherical wavefront in a pupil plane of the image-formation optical system by a displacement of a focal position of an objective.

* * * * *